United States Patent [19]
Ogura et al.

[11] Patent Number: 5,729,111
[45] Date of Patent: Mar. 17, 1998

[54] INERTIA LOWERING CONTROL APPARATUS CAPABLE OF SUPPRESSING AXIALLY TORSIONAL VIBRATION OCCURRING ON FLEXIBLE DRIVE SHAFT OF TWO-MASS INERTIA RESONANT SYSTEM

[75] Inventors: Kazuya Ogura; Yasuhiro Yoshida; Tetsuo Yamada, all of Tokyo, Japan

[73] Assignee: Kabushiki Kaisha Meidensha, Tokyo, Japan

[21] Appl. No.: 415,740

[22] Filed: Apr. 3, 1995

[30] Foreign Application Priority Data

Nov. 10, 1979 [JP] Japan ............................ 6-271645
Apr. 4, 1994 [JP] Japan ............................ 6-065763

[51] Int. Cl.$^6$ ............................................ G05B 5/01
[52] U.S. Cl. ............... 318/623; 318/609; 318/568.22; 318/632; 318/432
[58] Field of Search .................. 318/606–611, 623, 318/568.22, 632, 432

[56] References Cited

U.S. PATENT DOCUMENTS

| 4,047,002 | 9/1977 | Sloane et al. ............... 235/151.3 |
| 4,422,336 | 12/1983 | Beebe ............................ 73/769 |
| 5,136,228 | 8/1992 | Yamada et al. ................ 318/808 |

FOREIGN PATENT DOCUMENTS 4-319715  11/1992  Japan .

OTHER PUBLICATIONS

Patent Abstracts of Japan, Unexamined Applications, JP-A-05 176 580 Hitachi vol. 17, No. 593, (1993), p. 32.
Patent Abstracts of Japan, Unexamined Applications, JP-A-63 240 390 Hitachi vol. 13, No. 46, (1989), p. 112.
Patent Abstracts of Japan, Unexamined Applications, JP-A-04 319 715 Meidensha vol. 17, No. 149, (1993), p. 1509.

Japanese Book, "Introduction to Digital Control", pp. 70–87, Nov. 10, 1989.
Japanese Paper, "Vibration Control Of A 2 Mass Resonant System By The Resonance Ratio Control", T. IEE Japan, vol. 113–D, No. 10, pp. 1162–1169, (1993).
Japanses Paper, "Control For a Two–Mass System By Means Of The Resonance Ratio Control And SFC", Heisei 5 Electrical Society National Meeting, No. 669, pp. 6–78–6–79, (1993).
Japanese Paper, "Inertia Control Method For Induction Motor Drive System", Heisei 3 Electrical Society Industrial Application Department National Meeting, No. 142, pp. 612–613, (1991).
Japanese Paper, "Vibration Suppression Control In A Two--Mass Inertia Resonant System Using Inertia Lowering Control", Society of Electrical Engineering Of Japan, Document No. IEA–94–12, pp. 1–8, (1994).
Japanese Paper, "Application Of First–Order Lag Filter To Resonance Ratio Control And Its Utility In Inertia Lowering Control", Research Seminar Of Society Of Electrical Engineering, Document No. IEA–94–23, pp. 1–8, (1994).

Primary Examiner—David S. Martin
Attorney, Agent, or Firm—Foley & Lardner

[57] ABSTRACT

An inertia lowering control apparatus for a two-mass inertia system, the two-mass inertia system having a motor (induction motor), a load of the motor, and a flexible drive shaft having a low rigidity interconnected between the motor and load, is used to suppress an axially torsional vibration occurring on the flexible shaft in the two-mass inertia system. For example, the first-order lag filter having a transfer function as $1/(1+ST_F)$ is added at an output portion of the Simulator Following Control section which serves as a disturbance suppression circuit together with a shaft torque estimating observer to estimate a shaft applied torque $^\wedge\tau_S$. A simulation of the above-described example indicated that even if the observer gain of the shaft torque estimating observer was relatively small, the effect of suppressing the axially torsional vibration was remarkable.

26 Claims, 22 Drawing Sheets

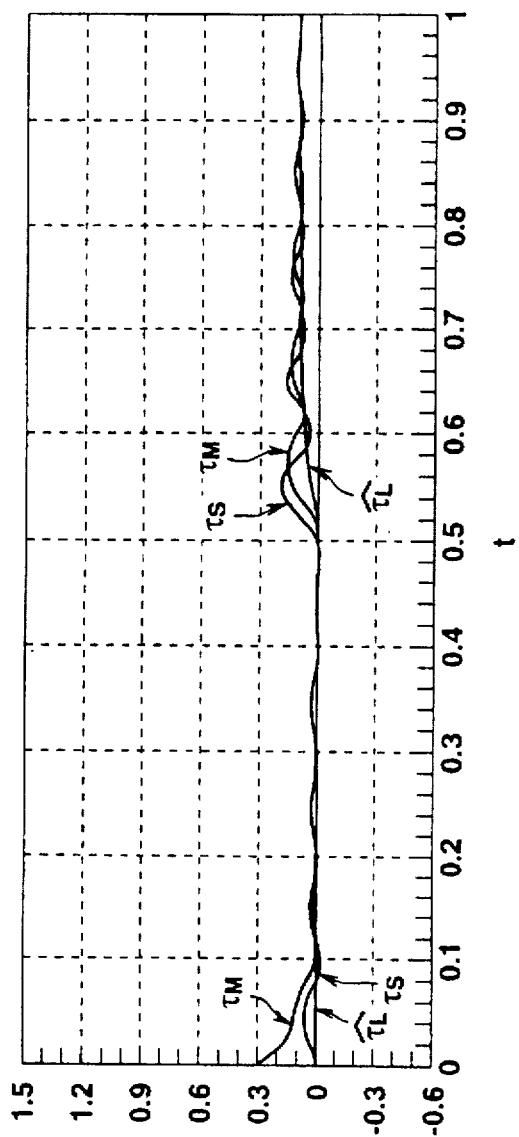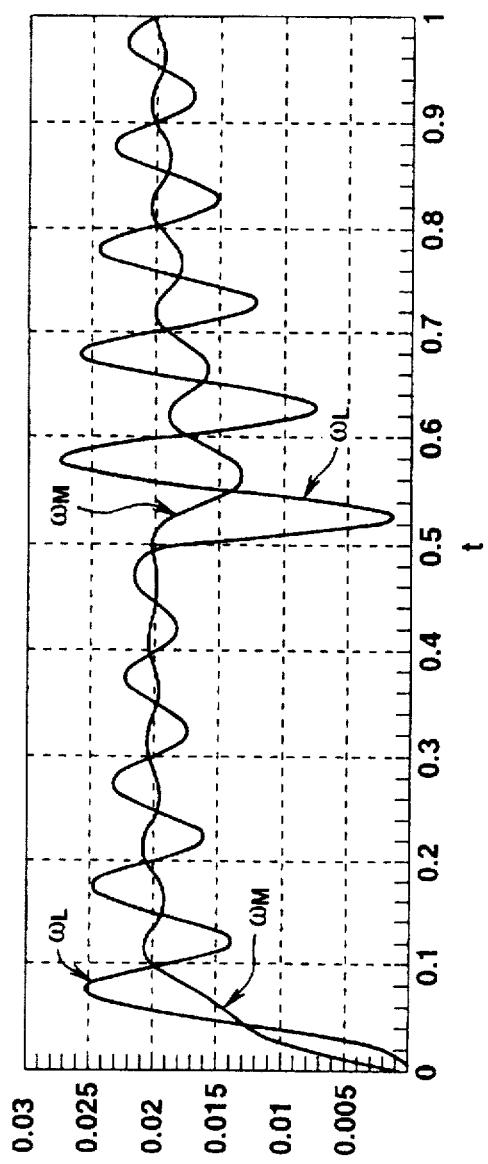
FIG.10A
FIG.10B

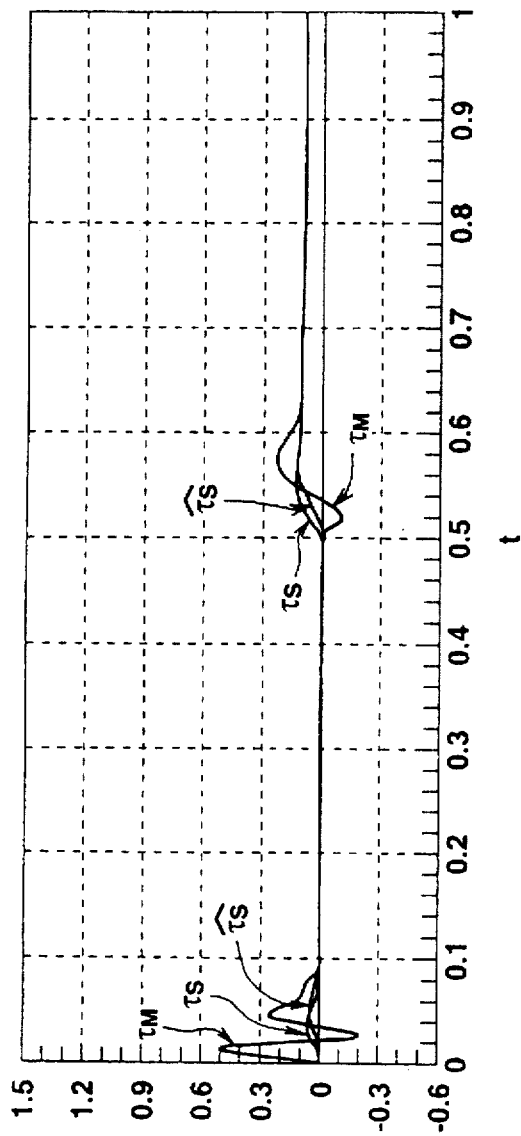
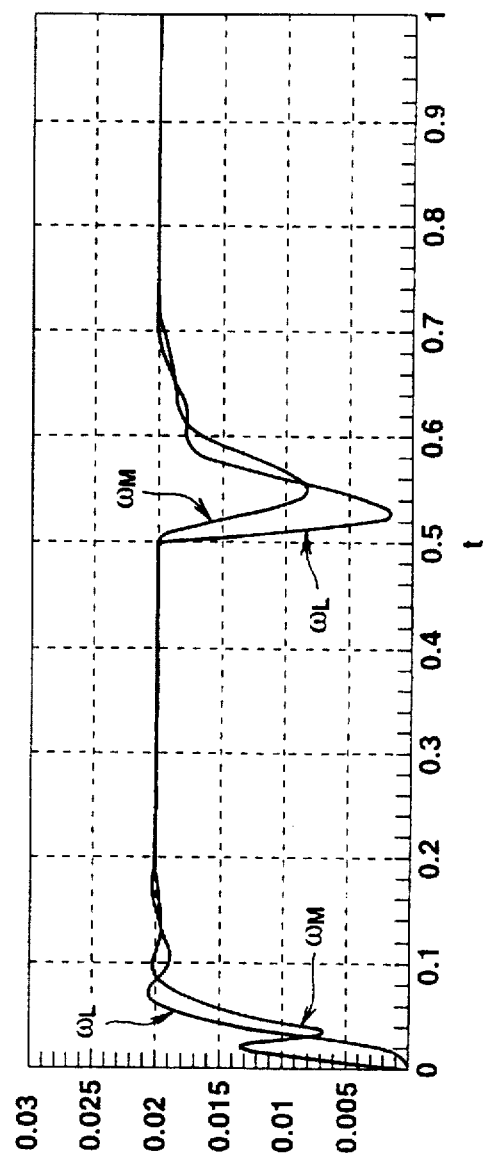
FIG.13A
FIG.13B

INERTIA LOWERING CONTROL APPARATUS CAPABLE OF SUPPRESSING AXIALLY TORSIONAL VIBRATION OCCURRING ON FLEXIBLE DRIVE SHAFT OF TWO-MASS INERTIA RESONANT SYSTEM

BACKGROUND OF THE INVENTION

1. Field of the Invention

The present invention relates to an inertia lowering control apparatus capable of suppressing a torsional vibration occurring on a resilient (or flexible) drive shaft of a two-mass inertia resonant system, particularly, the two-mass inertia resonance system having a motor and a load interconnected via the resilient (flexible) drive shaft.

2. Description of the Background Art

When a drive shaft (spindle) having a low rigidity is connected between a motor and its load such as in an elevator system, a steel roller, and an arm portion of a manipulator (robot), an axially (shaft) torsional vibration occurs so that it becomes impossible to speed up a response in a speed control system.

The axially torsional vibration is affected by a ratio in inertia moments between the motor and load. Particularly, in a case where the load inertia moment is lower than that of the motor, the torsional vibration becomes larger and its control to suppress the larger torsional vibration becomes further difficult.

A Japanese Paper entitled Vibration Control of a 2 Mass Resonant System by the Resonance Ratio Control described in pages 1162 through 1169 of T. IEE Japan, Vol. 113-D, No. 10 and published in 1993 (hereinafter, referred to as a reference A) exemplifies a resonance ratio control system in which a shaft torque (a torque applied to the flexible drive shaft) is estimated at a very high speed and the estimated shaft torque is fed back to a torque instruction to be supplied to the motor so that a deceptive (an apparent) motor inertia is lowered so as to stabilize the shaft torque, the resonance ratio being defined as a motor resonance frequency to, for example, a resonance frequency of the arm portion of the manipulator (robot).

In a case where the resonance ratio control described in the reference A is applied to the vibration suppression control, a preferable vibration suppression effect can be achieved even if the inertia of the load is lower than that of the motor. However, the effect of suppressing an external disturbance entering the vibration suppression system is, in turn, reduced.

Another Japanese Paper entitled Control for a two-mass system by means of the resonance ratio control and SFC described in pages 6–78 and 6–79 of No. 669 Heisei 5 Electrical Society National Meeting Published in 1993 (hereinafter referred to as a reference B) exemplifies the inertia lowering control system in which in addition to the system described in the reference A, a load torque estimating observer is added so as to improve the effect of suppressing the external disturbance.

A still another Japanese Paper entitled Inertia Control Method for Induction Motor Drive System described in pages 612 and 613 of Heisei 3 electrical Society Industrial Application Department National Meeting No. 142 published in 1991. (hereinafter referred to as a reference C) exemplifies the inertia lowering control method in a one-mass inertia system.

Herein, since a Japanese Patent Application First Publication No. Heisei 4-319715 published on Nov. 10, 1992 exemplifies a previously proposed shaft torsional vibration suppression system (the two-mass inertia system), equations off motions in the shaft (axially) torsional vibration system will be described below with reference to FIGS. 15 and 16.

From the two-mass inertial system model shown in FIG. 15, the following equations of motions are established:

$$\omega_M = 1/T_M S \cdot (\tau_M - \tau_S) \quad (1),$$

$$\omega_L = 1/T_L S \cdot (\tau_S - \tau_L) \quad (2), \text{ and}$$

$$\tau_S = Km(\theta_M - \theta_L) + Rm \cdot (\dot{\theta}_M - \dot{\theta}_L) \quad (3).$$

The above equation (3) can be substituted by $$\tau_S = \frac{1}{T_S S} (\omega_M - \omega_L) + Rm(\omega_M - \omega_L), \quad (4)$$

wherein $\omega_M = d\theta_M/dt$, $\omega_L = d\theta_L/dt$, $\theta_M = \int \omega_M dt$, $\theta_L = \int \omega_L dt$.

FIG. 16 shows the circuit block diagram of the shaft (axially) torsional vibration system using the above equation (4).

In the equations (1) through (4) and FIG. 16, $\tau_M$ denotes a generation torque of the motor, $\tau_S$ denotes the shaft torque (axial torque, i.e, the torque applied to the drive shaft), $\tau_L$ denotes a load torque (a torque applied to the load of the motor), $\omega_M$ and $\omega_L$ denote angular velocities of the motor and the load, 74 $_M$ and $\theta_L$ denote the angular displacements of the motor and load, $T_M$ and $T_L$ denote motor and load mechanical time constants (rated torque of the motor—rated revolution speed), Ts denotes the drive shaft spring constant (1/Km), and Rm denotes a viscous coefficient of the flexible drive shaft.

Transfer functions of the axially torsional vibration system described in the above-identified JP-A1-4-319715 will be described below.

That is to say, the transfer function $G_{MM}(S)$ from the motor generation torque $\tau_M$ to the motor angular velocity $\omega_M$ and those of $G_{MM}(S)$ and $G_{ML}(S)$ from the generation torque $\tau_M$ to the load angular velocity $\omega_L$ are derived as follows with the shaft viscous coefficient Rm (Rm=0) neglected:

$$G_{MM}(S) = \frac{\omega_M}{\tau_M} = \frac{1}{T_M S} \cdot \frac{S^2 + \frac{1}{T_S T_L}}{S^2 + \frac{1}{T_S}\left(\frac{1}{T_M} + \frac{1}{T_L}\right)}. \quad (5)$$

$$G_{LM}(S) = \frac{\omega_M}{\tau_L} = -\frac{1}{T_L S} \cdot \frac{\frac{1}{T_M T_S}}{S^2 + \frac{1}{T_S}\left(\frac{1}{T_M} + \frac{1}{T_L}\right)}. \quad (6)$$

$$G_{ML}(S) = \frac{\omega_L}{\tau_M} = \frac{1}{T_M S} \cdot \frac{\frac{1}{T_S T_L}}{S^2 + \frac{1}{T_S}\left(\frac{1}{T_M} + \frac{1}{T_L}\right)}. \quad (7)$$

Furthermore, the transfer function from $\tau_L$ to $\omega_L$ is derived as follows:

$$G_{LL}(S) = \frac{\omega_L}{\tau_L} = -\frac{1}{T_L S} \cdot \frac{S^2 + \frac{1}{T_M T_S}}{S^2 + \frac{1}{T_S}\left(\frac{1}{T_M} + \frac{1}{T_L}\right)}. \quad (8)$$

Herein, if the above equation (8) is compared with a generally expressed second-order lag system, namely, $K\omega_n^2/(S^2+2\zeta\omega_n+\omega_n^2)$, the following equation is established:

$$\zeta = 0, \omega_n = \sqrt{\frac{1}{T_S}\left(\frac{1}{T_M}+\frac{1}{T_L}\right)}. \quad (9)$$

In detail, since the viscous coefficient Rm is approximated to zero (Rm=0), $\zeta=0$ so that the above described shaft (axially) torsional vibration system indicates a permanent vibration system.

In addition, its resonance frequency indicates $\omega_n$.

Next, when poles to make a denominator (the denominator is expressed in an equation (10) in the transfer function of the equation (8)) equal to zero, the following equation (11) is established.

$$S^2 + \frac{1}{T_S}\left(\frac{1}{T_M}+\frac{1}{T_L}\right) = 0. \quad (10)$$

$$S = \pm j\sqrt{\frac{1}{T_S}\left(\frac{1}{T_M}+\frac{1}{T_L}\right)}. \quad (11)$$

As appreciated from the equation (11), since the poles are present on an imaginary axis (j), the axially torsional vibration system, i.e., the two-mass inertia system indicates vibratile.

In the resonance ratio control described in the above references A and B, it is necessary to enlarge the gain of the shaft torque estimating observer and estimate the shaft torque $^\wedge\tau_S$ at a relatively high speed. "$^\wedge$" denotes an estimated value such that $^\wedge\tau_S$ denotes an estimated shaft torque. However, the gain of the shaft torque estimating observer cannot be enlarged with the amplification of noise superimposed on the detected angular velocity of the motor taken into consideration and the effect of suppressing the axially torsional vibration occurring on the flexible shaft interconnected between the motor and load is reduced.

SUMMARY OF THE INVENTION

It is, therefore, an object of the present invention to provide an inertia lowering control apparatus for a two-mass inertia system which is capable of suppressing the axially torsional vibration occurring on a flexible drive shaft in a two-mass inertia (resonant) system and is capable of improving a vibration suppression effect in the two-mass inertia (resonant) system even when a gain of an installed shaft torque estimating observer is relatively small.

The above-described object can be achieved by providing an inertia lowering control apparatus used for suppressing an axially torsional vibration occurring on a a flexible drive shaft in a two-mass inertia resonant system, said system having a motor, the flexible drive shaft, and a load off the motor, and having four transfer functions as:

$G_{MM}(S)=\omega_M/\tau_M=1/T_M\cdot S\cdot\{S^2+1/(T_S\cdot T_L)\}/\{S^2+1/T_S\cdot(1/T_M+1/T_L)\}$, $G_{LM}(S)=\omega_M/\tau_L=-1/T_L S\cdot\{(1/T_M)\cdot(1/T_S)\}/\{S^2+1/T_S(1/T_M+1/T_L)\}$, $G_{ML}(S)=\omega_L/\tau_L=1/T_M S\cdot\{(1/T_S)\cdot(1/T_L)\}/\{S^2+1/T_S(1/T_M+1/T_L)\}$, and $G_{LL}(S)=\omega_L/\tau_L=-1/T_L S\cdot\{S^2+1/T_M\cdot 1/T_S\}/\{S^2+1/T_S(1/T_M+1/T_L)\}$, wherein S=σ+jω and denotes a Laplace transform operator, $\omega_M$ denotes a motor angular velocity, $\tau_M$ denotes a motor generation torque, $\tau_L$ denotes a load applied torque, $\omega_L$ denotes a load angular velocity, $T_M$ denotes a motor mechanical time constant, $T_S$ denotes a shaft spring time constant (=1/Km), $T_M$ denotes a motor mechanical time constant, and $T_L$ denotes a load mechanical time constant, said inertia lowering control apparatus comprising: a) detecting means for observing the motor angular velocity ($\omega_M$) and outputting the observed the motor angular velocity; b) velocity amplifying means, having a first deviator, for amplifying a deviation between a motor angular velocity instruction value ($\omega_M^*$) and the observed motor angular velocity derived from the first deviator with at least a proportional control gain (K$\omega$c); c) disturbance suppressing means, receiving the amplified deviation $\tau_A$ from said velocity amplifying means and the observed motor angular velocity ($\omega_M$), for providing an input torque $\tau_i$ for the motor constituting the two-mass inertia resonant system so that a disturbance is prevented from being input to the motor; d) vibration suppressing means, receiving the output $\tau_i$ from said disturbance suppressing means, for filtering the output $\tau_i$ of said disturbance suppressing means so as to suppress the axially torsional vibration in the two-mass-inertia resonant system and so as to provide the motor generation torque instruction value $\tau_M$; and e) shaft applied torque estimating observer means which is so constructed and arranged as to receive the observed motor angular velocity and the motor generation torque instruction value and as to estimate a shaft applied torque value ($^\wedge\tau_S$), said estimated shaft applied torque value being supplied to said vibration suppressing means.

The above-described object can also be achieved by providing an inertia lowering control apparatus used for suppressing an axially shaft torsional vibration in a two-mass inertia resonant system, said system having a motor, a load, and a flexible drive shaft connecting both of said motor and load and having four transfer functions as:

$1\ G_{MM}(S)=\omega_M/\tau_M=1/T_M S\cdot\{S^2+1/(T_S\cdot T_L)\}/\{S^2+1/T_S\cdot(1/T_M+1/T_L)\}$, $G_{LM}(S)=\omega_M/\tau_L=-1/T_L S\cdot\{(1/T_M)\cdot(1/T_S)\}/\{S^2+1/T_S(1/T_M+1/T_L)\}$, $G_{ML}(S)=\omega_L/\tau_L=1/T_M S\cdot\{(1/T_S)\cdot(1/T_L)\}/\{S^2+1/T_S(1/T_M+1/T_L)\}$, and $G_{LL}(S)=\omega_L/\tau_L=-1/T_L S\cdot\{S^2+1/T_M\cdot 1/T_S\}/\{S^2+1/T_S(1/T_M+1/T_L)\}$, wherein S=σ+jω and denotes a Laplace transform operator, $\omega_M$ denotes a motor angular velocity, $\tau_M$ denotes a motor generation torque, $\tau_L$ denotes a lead applied torque, $\omega_L$ denotes a lead angular velocity, $T_M$ denotes a motor mechanical time constant, $T_S$ denotes a shaft spring time constant (=1/Km), $T_M$ denotes a motor mechanical time constant, and $T_L$ denotes a mechanical time constant, said inertia lowering control apparatus comprising: a) means for detecting an angular velocity of the motor $\omega_M$; b) a Proportional-Integral velocity amplifier which is so constructed and arranged as to amplify a deviation output between a motor angular velocity instruction value $\omega_M^*$ of the motor and the detected angular velocity of the motor $\omega_M$; c) a flexible drive shaft applied torque estimating observer having a first-order lag filter and which is so constructed and arranged as to derive an estimated value $^\wedge\tau_S$ of the shaft applied torque via said first-order lag filter, said first-order lag filter having a transfer function as $(1+ST_F)/\{(1+ST)(1+ST_F/K)\}$, wherein T denotes an observer time constant and approximately equal to $T_F$; d) a gain circuit which is so constructed and arranged as to amplify the shaft applied torque estimated value derived through the first-order lag Filter with a gain of (K−1), wherein K denotes a inertia ratio between the motor and load; f) a deviator which is so constructed and arranged as to output a deviation between an output of the gain circuit and the input torque $\tau_i$ which is derived from the PI amplifier and multiplied by the gain of K; and g) a compensation filter which is so constructed and arranged as to receive an output of the deviator and provide a torque instruction value $\tau_M$ for the motor, said compensation filter having a transfer function of $(1+ST_F/K)/(1+ST_F)$, wherein S denotes a Laplace transform operator.

BRIEF DESCRIPTION OF THE DRAWINGS

FIGS. 10A and 10B are characteristic graphs representing simulation results in a case where a conventional system described in the BACKGROUND OF THE INVENTION is actually operated.

FIGS. 13A and 13B are characteristic graphs representing simulation results in a case where the inertia lowering control apparatus in the first embodiment shown in FIG. 1 is actually operated and representing that an effect of suppressing vibration is improved according to filter time constant.

BEST MODE CARRYING OUT THE INVENTION

Reference will hereinafter be made to the drawings in order to facilitate a better understanding of the present invention.

Before explaining various preferred embodiments of an inertia lowering control apparatus according to the present invention, a basic concept of the present invention will be explained below.

That is to say, according to the present invention, a shaft torque, i.e., a torque applied onto a flexible drive shaft in, for example, a two-mass inertia resonance system is estimated and a low inertia control is carried out so as to execute a suppression of a shaft (axially) torsional vibration occurring on the flexible drive shaft, the flexible meaning a low rigidity.

Thus, at first, a minimal order observer will be described below with reference to FIG. 17.

Figure 17:
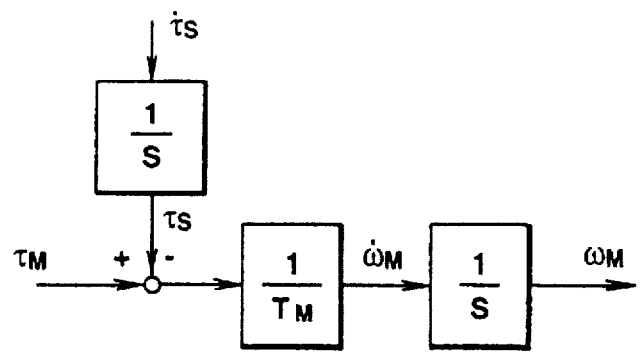
FIG. 17 is a circuit block diagram for explaining and explaining a minimal order state observer.

FIG. 17 shows a circuit block diagram of a motor torque instruction value $\tau_M$ to an actual motor angular velocity $\omega_M$. Suppose, herein, that the shaft torque is a stepwise constant value. Thus, a shaft torque differential value gives 0.

A state equation (12) is given from the circuit blocks shown in FIG 17.

$$\dot{\omega}_M = \frac{1}{T_M} \cdot \tau_M - \frac{1}{T_M} \tau_S \quad \dot{\tau}_S = 0 \tag{12}$$

It is noted that the state equation (12) can be represented by the following matrices (13) and (14).

$$\begin{bmatrix} \dot{\omega}_M \\ \dot{\tau}_S \end{bmatrix} = \begin{bmatrix} 0 & -\frac{1}{T_M} \\ 0 & 0 \end{bmatrix} \begin{bmatrix} \omega_M \\ \tau_S \end{bmatrix} + \begin{bmatrix} \frac{1}{T_M} \\ 0 \end{bmatrix} \tau_M. \tag{13}$$

$$y = \omega_M = (1\ 0) \begin{bmatrix} \omega_M \\ \tau_S \end{bmatrix}. \tag{14}$$

Since the motor angular velocity $\omega_M$ is measurable (observable), the shaft torque $\tau_S$ is estimated using the minimal order observer.

Figure 18:
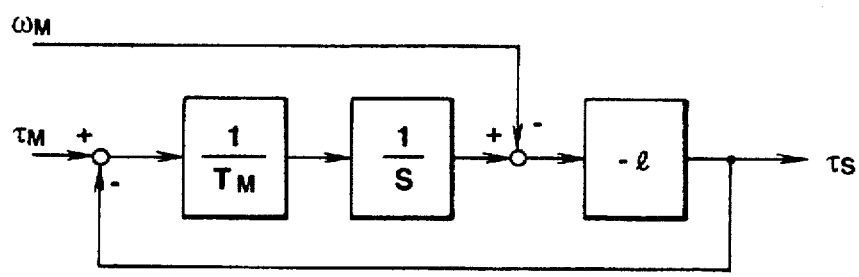
FIG. 18 is a schematic explanatory view of a shaft torque estimating observer.

FIG. 18 shows the shaft torque estimating observer derived on the basis of the minimal order observer using a well known method by B. Gopinath.

(For the method of B. Gopinath and minimal order observer, refer to a Japanese Book entitled Introduction to Digital Control published by Corona Publishing Co., Ltd. in Nov. 10, 1989.)

Next, the inertia lowering control and resonance ratio control are compared to each other.

First, a general concept of the inertia lowering control method described in the reference C described in the BACKGROUND OF THE INVENTION will be described below.

Figure 19:
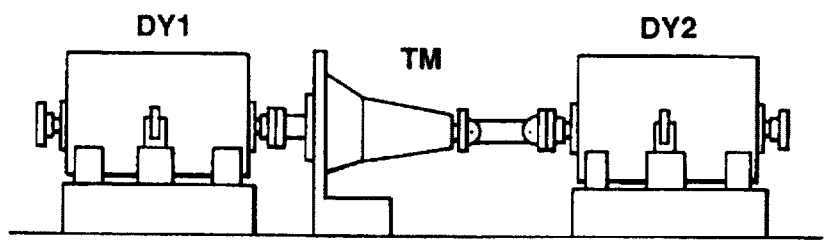
FIG. 19 is a schematic structural view of a power train tester constituting the two-mass inertia system.

FIG. 19 exemplifies an application example of a simulative testing system requiring the inertia lowering control, i.e., showing a simulation testing system for a vehicular power transmission TM.

In FIG. 19, a first dynamometer DY1 is simulated to serve as an engine and a second dynamometer DY2 is simulated to serve as a load. It is noted that since the engine used in the vehicle is generally low in inertia, it is required that the inertia of the first dynamometer DY1 be controlled so that its inertia is apparently reduced and so as to meet requirements for the engine. This is because the inertia lowering control has been proposed.

Figure 20:
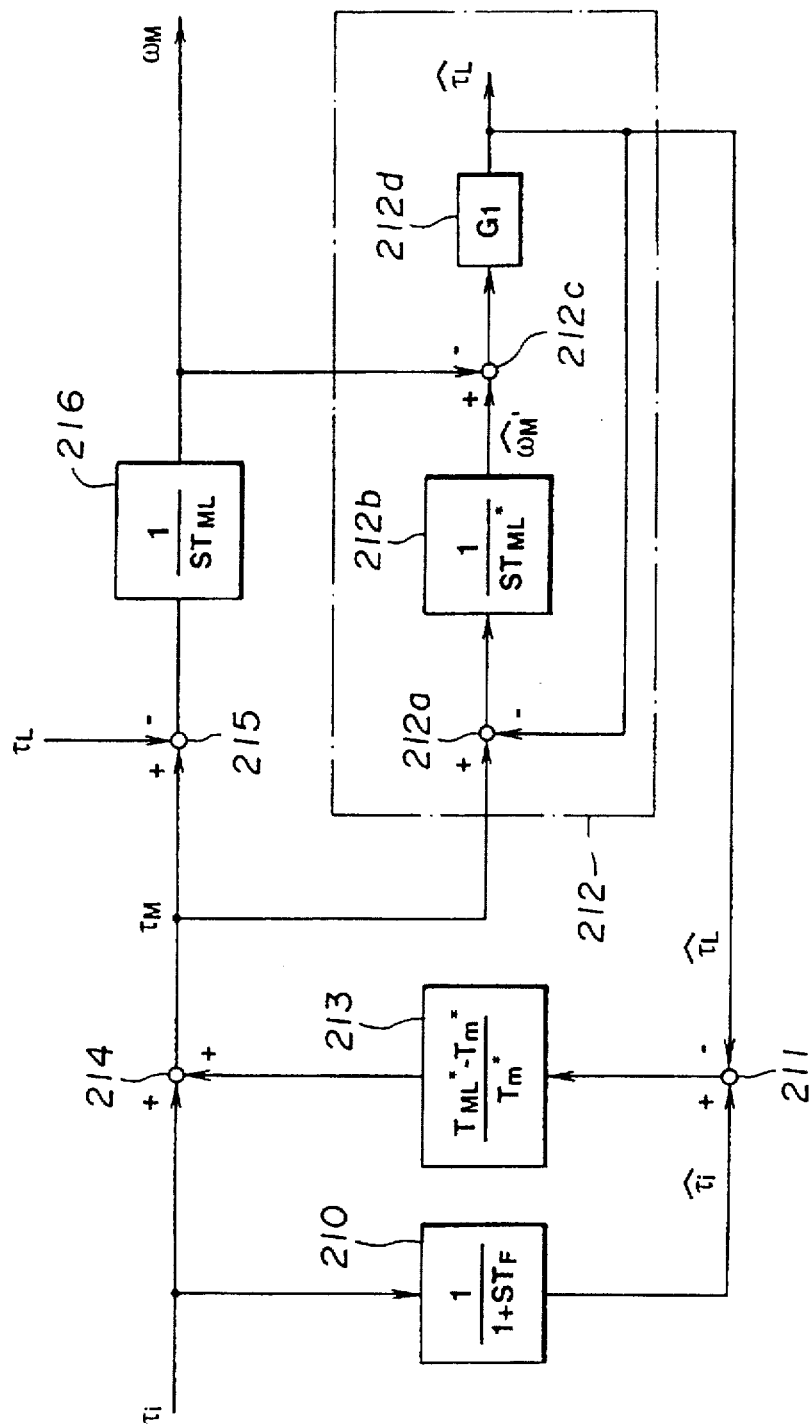
FIG. 20 is a circuit block diagram in the low inertia system control apparatus in a one-mass inertia system.

FIG. 20 shows a block diagram of the inertia lowering control system described above which is applicable to the simulative testing system in FIG. 19 and which is based on the inertia control method for the induction motor drive system described in the reference C.

In FIG. 20, the inertia lowering control system includes a first-order lag filter 210 which is so constructed and arranged so as to receive an input torque $\tau_i$ and output an input torque estimated value $\hat{\tau}_i$ (having $T_F$ denoting a first-order lag filter time constant), the estimated input torque $\hat{\tau}_i$ being supplied to a plus end of a first deviator 211. A minus cud of the first deviator 211 receives a load torque estimated value $\hat{\tau}_L$ from a load torque estimating observer 212 as will be described later.

The inertia lowering control system shown in FIG. 20 further includes an inertia moment calculating circuit 213 which is so constructed and arranged as to receive a deviation output of the first deviator 211 and output the calculated inertia moment $\{(T_{ML}^* - T_m^*)/T_m^*\}$ to an adder 214 to be added to the input torque $\tau_i$, the adder 314, thereby, outputting the motor generation torque $\tau_M$. The generation torque $\tau_M$ of the motor is supplied to a plus end off a second deviator 215 and a plus end of a third deviator 212a of the load torque estimating observer 212. A minus end of the second deviator 215 is supplied with the load torque $\tau_L$. A deviation output of the second deviator 215 is input to an integrating element portion 216 concerning a total of the inertia moments being denoted by $T_{ML}$ when both of the First and second dynamometers DY1 and DY2 shown in FIG. 19 are supposed to constitute the one-mass inertia system, i.e., the integrator element 216. An output of the integrator element 216 having the transfer function as $1/ST_{ML}$ is the motor angular velocity $\omega_M$.

The load torque estimating observer 212 includes: a) an integrator element portion 212b for integrating the derivation output of the third deviator 212a with the observer inertia moment $T_{ML}^*$ ($1/ST_{ML}^*$) to provide a motor angular velocity estimated value $\hat{\omega}_M'$; b) a fourth deviator 212c which is so constructed and arranged as to take a deviation between the motor angular velocity estimated value $\hat{\omega}_M'$ and the motor angular velocity $\omega_M$; and c) an observer gain portion having a gain of $G_1$ and receiving the deviation output of the fourth deviator 212c. Thus, the load torque estimating observer 212 provides a load toque estimated value $\hat{\tau}_L$, this load torque estimated value being supplied to the third deviator 212a and first deviator 211. In FIG. 20, $T_m^*$ described in the inertia moment calculating portion 213 denotes an inertia moment when the inertia of the on-mass inertia system is lowered.

According to the inertia lowering control system shown in FIG. 20, the following equations (15) through (17) are derived:

$$\omega_M = \frac{1}{ST_{ML}} (\tau_M - \tau_L), \tag{15}$$

$$\hat{\tau}_L = G1(\hat{\omega}_M' - \omega_M), \tag{16}$$

$$\hat{n}_M' = \frac{1}{ST_{ML}^*} (\tau_M - \hat{\tau}_L). \tag{17}$$

If $T_{ML}$ (the total of the inertia moments derived when both of the first and second dynamometers DY1 and DY2 are supposed to constitute the one-mass inertia system)=$T_{ML}^*$ (inertia moment in the observer 212), the following equation (18) is established from the above equations (15) through (17).

$$\hat{\tau}_L = \frac{1}{1 + ST_{ML}^*/G_1} \cdot \tau_L. \tag{18}$$

As appreciated from the equation (18), a value estimated by the first-order lag filter from the load torque $\tau_L$ is the load torque estimated value $\hat{\tau}_L$.

Herein, a theory of operation in the inertia lowering control of FIG. 20 will be described below.

Figure 21:
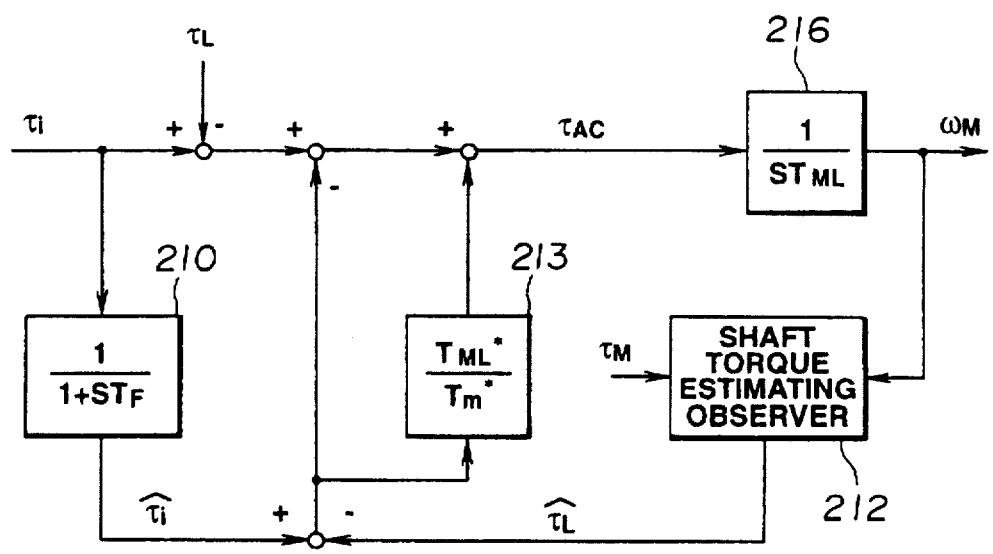
FIG. 21 is a circuit block diagram of a variation in the low inertia system shown in FIG. 20.

FIG. 21 shows the circuit block diagram of the inertia lowering control apparatus which is a slight modification from that of FIG. 20.

Supposing that the load torque estimation and input torque estimation are carried out at a very high speed in FIG. 21, an acceleration-and-deceleration torque $\tau_{AC}$ of the motor (first and second dynamometers) is expressed in the following equation.

$$\begin{aligned}\tau_{AC} &= T_{ML}^*/T_m^*(\hat{\tau}_i - \hat{\tau}_L) \\ &= T_{ML}^*/T_m^*(\tau_i - \tau_L)\end{aligned} \tag{19}$$

In the equation (19), if $T_{ML}=T_{ML}^*$, the relationship from the acceleration-and-deceleration torque $\tau_{AC}$ to the motor angular velocity $\omega_M$ is represented by the following equation (20). The inertia of the motor apparently provides $T_m^*$ so that the velocity control with the inertia of the motor lowered, i.e., the inertia lowering control can be achieved.

$$\omega_M = T_{ML}^*/T_m^*(\tau_i - \tau_L) \cdot 1/ST_{ML} \quad (20)$$
$$= 1/ST_m^*(\tau_i - \tau_L)$$
$$= 1/ST_m^* \tau_{AC}$$

As described above, if it is possible to estimate the load torque at a very high speed (.i.e., $\hat{\tau}_L \approx \tau_L$, $\hat{\tau}_i \approx \tau_i$), the inertia lowering control becomes possible in the case of FIG. 20.

Next, the resonance ratio control described in the references A and B of the BACKGROUND OF THE INVENTION will be described below.

Figure 16:
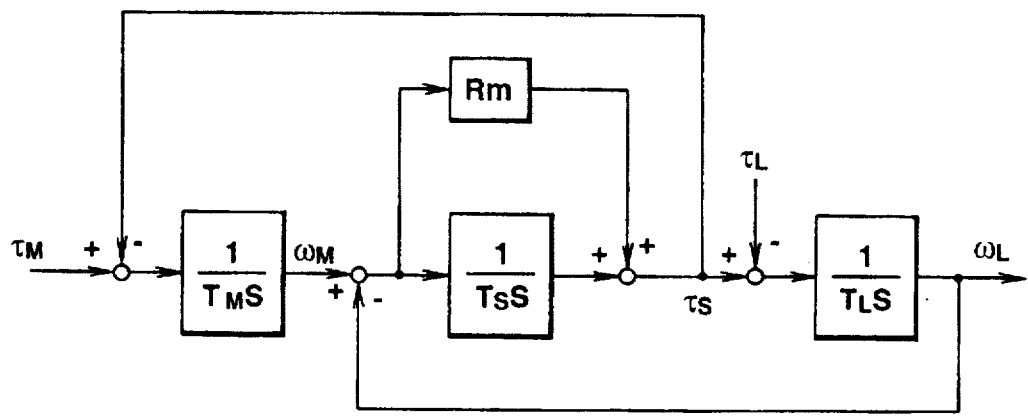
FIG. 16 is a circuit block diagram of a two-mass inertia system.
Figure 22:
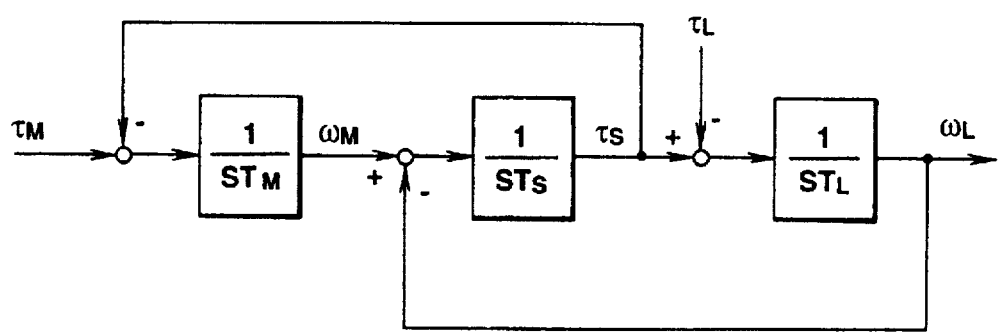
FIGS. 22 is a circuit block diagram of a two-mass inertia system when a viscous coefficient Rm is approximated to zero in FIG. 16.

The circuit block diagram of the two-mass inertia system when Rm=0 (approximation) in FIG. 16 is shown in FIG. 22. That is to say, FIG. 22 shows the two-mass inertia system with Rm=0 of FIG. 16. In FIG. 22, each numeral reference shown in FIG. 22 is the same as that shown in FIG. 16.

The motor generation torque $\tau_M$ and angular velocity $\omega_M$ are used to be input to the shaft torque estimating observer shown in FIG. 18 and the shaft estimated torque estimated value $\hat{\tau}_S$ is multiplied by (1−K) and (1−K)$\hat{\tau}_S$ is added to $\tau_i'$ so that a feedforward compensation is made.

Figure 23:
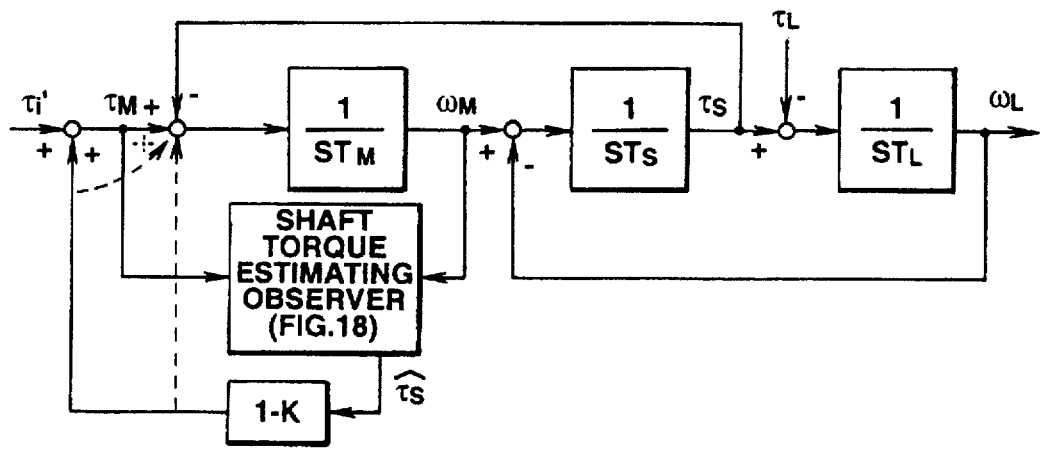
FIG. 23 is a circuit block diagram of the two-inertia system shown in FIG. 22 in addition to which a feedback compensation is made.

FIG. 23 shows the circuit block diagram of the two-mass inertia system with the feedforward compensation and the shaft torque estimating observer described above added.

Figure 24:
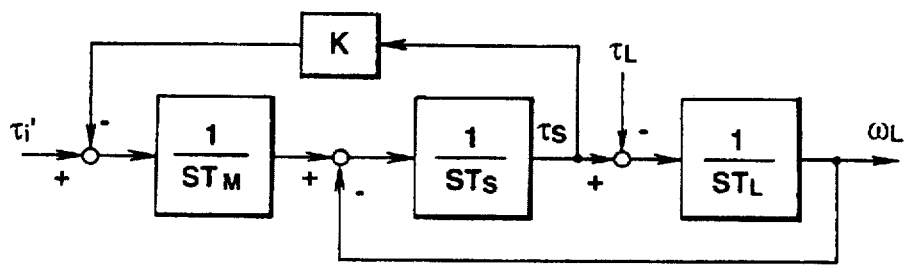
FIG. 24 is a circuit block diagram of a modification of the two-inertia system of FIG. 23 for explaining an effect of resonance ratio control.

Supposing that the shaft torque estimated value $\hat{\tau}_S$ can be derived at the very high speed and, thus, the shaft torque estimated value $\hat{\tau}_S \approx \tau_S$, the achieved circuit block diagram is shown in FIG. 24.

That is to say, FIG. 24 shows the two-mass inertia system which is a modification of FIG. 23 with $\hat{\tau}_S \approx \tau_S$.

Figure 25:
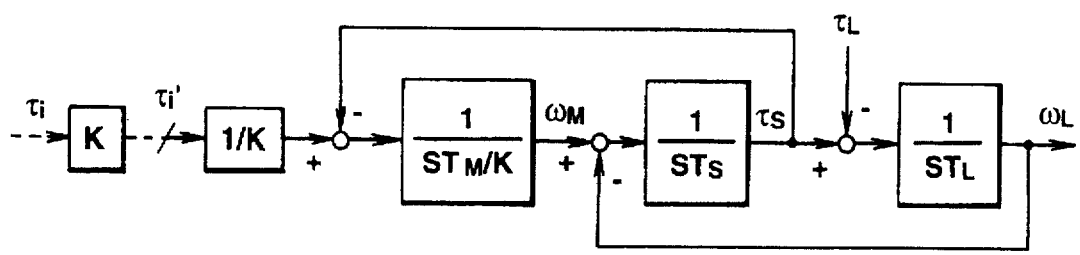
FIG. 25 is a circuit block diagram for explaining a resonance ratio control.

In addition, if the circuit block diagram shown in FIG. 24 is modified to derive the circuit block diagram of the resonance ratio control shown in the reference B is shown in FIG. 25.

FIG. 25 shows the circuit block diagram of the resonance ratio control system for the two-mass inertia (resonant) system.

It is noted that the motor constituting the two-mass inertia system 19 comprises an induction motor exemplified in a U.S. Pat. No. 5,136,228 issued on Aug. 4, 1992 (the disclosure of which is herein incorporated by reference).

From FIG. 25, the resonance ratio control is carried out so that the motor inertia is apparently (1−K). In addition, it is necessary to multiply the torque instruction by K since after $\tau_i'$, (1−K) is derived in the compensation circuit shown in FIG. 24. The relationship between the resonance ratio R and an inverse of the motor inertia (namely, inertia lowering control feedback gain) K is derived from the references A and B.

$$K = T_M(R^2 - 1)/T_L \quad (21)$$

R: $R^2 = 5$ is an optimum value of the axially torsional vibration suppression from the reference A.

If the following three substitutions (A), (B), and (C) are carried out according to the inertia lowering control (FIGS. 20 and 21) and resonance ratio control described above (FIGS. 24 and 25), the inertia lowering control is the same as the resonance ratio control. That is to say, when the following three substitutions of (1) through (3) are carried out, the inertia lowering control system has the equivalent circuit block diagram before insertion of SFC (Simulator Following Circuit) described in the reference B.

(A) Although the inertia lowering control shown in FIG. 20 is applied to the one-mass inertia system, this inertia system is handled as the two-mass inertia system having the first dynamometer DY1 as one mass and second dynamometer DY2 as another mass; $T_{ML} \rightarrow T_M$.

(B) $T_{ML}^*$ shown in FIG. 20 → $T_M^*$.

(C) $T_{ML}^*/Tm$ shown in FIG. 20 = K.

(First Embodiment)

Figure 1:
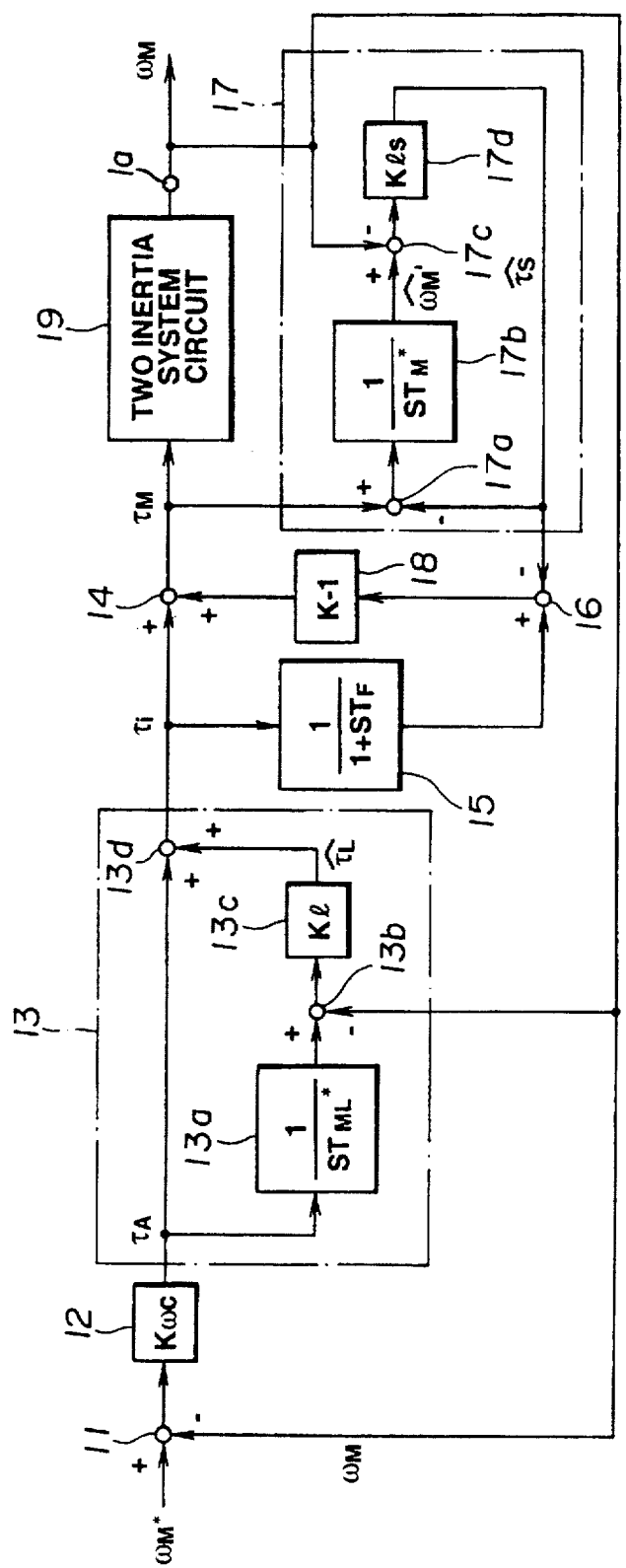
FIG. 1 is a circuit block diagram of a first preferred embodiment of an inertia lowering control apparatus for suppressing a torsional vibration occurring on a flexible shaft in a two-mass inertia resonance system according to the present invention.

FIG. 1 shows a circuit block diagram of the inertial lowering control apparatus which can suppress the axially torsional vibration occurring on the flexible drive shaft in the two-mass inertia (resonant) system (circuitry) 19 in a first preferred embodiment according to the present invention. The two inertia system circuit 19 described in a circuit block is equivalent to the circuit block diagram of the two-mass inertia system shown in FIG. 22.

In FIG. 1, reference numeral 11 denotes a first deviator which is so constructed and arranged as to deviate between a motor (constituting the two-mass inertia (resonant) system circuit 19) angular velocity instruction value $\omega_M^*$ and the actually detected motor angular velocity $\omega_M$ from the two-mass inertia system circuit 19.

A velocity amplifier 12 having a PI (Proportional-Integral) control gain or P (Proportional) control gain (for example, denoted by K$\omega$c) receives a deviation output of the first deviator 11. An output of the velocity amplifier 12 is supplied to a disturbance suppression circuitry 13 (herein referred to as SFC (Simulator Following Control) section). It is noted that S defined and described in the whole specification and drawings denotes a Laplace transform operator.

The SFC section 13 includes: a) an integrator 13a integrating the output of the Velocity amplifier 12 as 1/(S·$T_{ML}^*$) ($T_{ML}^*$ corresponds to the inertia moment of the load torque estimating observer 212 in FIG. 20); b) a second deviator 13b which is so constructed and arranged as to deviate between an integrated output of the integrator 13a and the motor angular velocity $\omega_M$; c) a gain portion 13c, having a gain K1 set to the SFC section 13, which is so constructed and arranged as to receive the deviation output of the second deviator 13b; and d) an adder 13d which adds an output of the gain portion 13c and the output of the velocity amplifier 12 to provide an input torque value of the motor $\tau_i$.

A first-order lag filter 15 is provided to receive the input torque instruction value $\tau_i$ from the adder of the SFC section 13, have a time constant denoted by $T_F$, and to function as an axially torsional vibration suppression circuit in the first embodiment.

An output of the first-order lag filter 15 is supplied to a plus end of a third deviator 16 and a minus end of the third deviator 16 receives the shaft torque estimated value $\hat{\tau}_S$ from the shaft (axis) torque estimating observer 17. A deviation output of the third deviator 16 is supplied to the above-described adder 14 via an inertia lowering gain portion 18 having a gain expressed as K−1. The adder 14 receives an output of the inertia lowering gain portion 18.

It is noted that an output of the adder 14 is supplied to the two-mass inertia (resonant) system 19 as a motor torque instruction value $\tau_M$. The two-mass inertia resonance system 19 is equivalent to FIG. 22.

It is also noted that the motor torque instruction value (motor generation torque) $\tau_M$ is also supplied to the shaft torque estimating observe 17.

The shaft torque estimating observer 17 includes: a) an integrator 17b integrating a deviation output off a fourth deviator 17a as 1/$T_{ML}^*$ ($T_{ML}^*$ denotes the inertia moment of the observer 17) and providing a motor angular velocity estimated value $\hat{\omega}_M'$ at its output; b) a fifth deviator 17c which is so constructed and arranged as to deviate the motor angular velocity estimated value $\hat{\omega}_M$ and the motor angular velocity $\omega_M$; and an observer gain portion 17d having an observer gain Kls and receiving the deviated output of the fifth deviator 17c.

It is noted that, in FIG. 1, $T_{ML}^*$ described in the integrator 13a is set to $T_M + T_L$ and $T_M^*$ described in the other integrator 17b is set to $T_M$ and K denotes the inertia lowering gain.

As shown in FIG. 1, the first deviator 11 derives the deviation between the motor angular velocity instruction value $\omega_M^*$ and the motor angular velocity $\omega_M$. The deviation output from the first deviator 11 is supplied to the SFC section 13 via the velocity amplifier 12. The SFC section 13 serves to suppress the disturbance and to provide the input torque value $\tau_i$ at its output.

When the input torque value $\tau_i$ is input to the first-order lag filter 15, the output having an influence from the time constant of $T_F$ in the filter 15 is supplied to the third deviator 16 together with the output of the shaft torque estimating observer 17 to provide the deviated output at its output.

At this time, even when the gain in the shaft torque estimating observer 17 is minor, the deviation output of the third deviator 16 is added to the input torque $\tau_i$ via the inertia lowering gain portion 18 to obtain the motor generation torque (motor torque instruction value) $\tau_M$. Since this generation torque is supplied to the two-mass inertia system circuit 19 and shaft torque observer 17, the vibration suppression effect can be improved even in the two-mass inertia system (circuit) 19. This effect will be described later.

(Second Embodiment)

Figure 2:
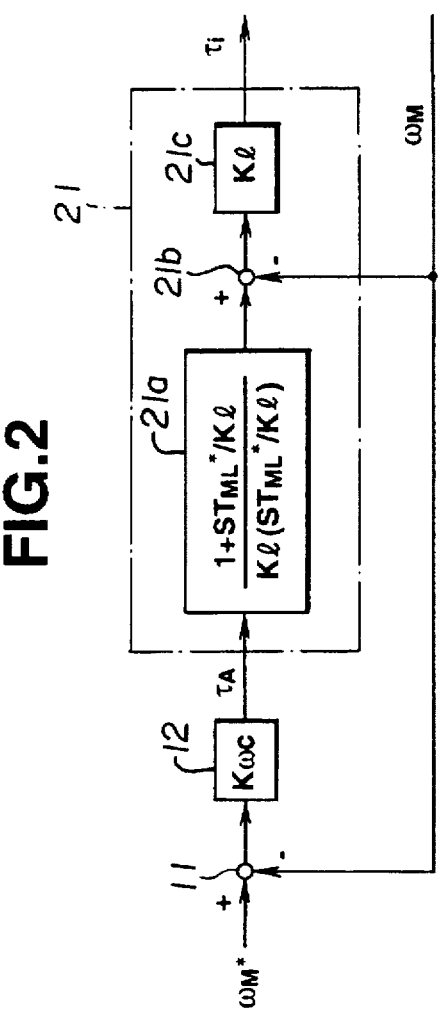
FIG. 2 is a circuit block diagram of a disturbance suppression circuitry in a second preferred embodiment of the inertia lowering control apparatus according to the present invention.

FIG. 2 shows a second preferred embodiment of the inertia lowering control apparatus which is capable of suppressing the axially torsional vibration occurring on the flexible drive shaft of the two-mass inertia resonant system 19.

It is noted that, in the second embodiment, the SFC section 13 shown in FIG. 1 is modified as shown in FIG. 2. Therefore, the other circuit blocks expect the SFC section 13 are the same as those shown in FIG. 1.

In addition, the operation in the second embodiment is generally the same as that in the case of the first embodiment. In the second embodiment, the velocity amplifier 12 may have only the proportional gain K$\omega$c.

The SFC section 21 in the second embodiment includes: a) the PI element and velocity feedback circuit; b) the third deviator 13b; and c) a gain portion 13c having the gain (amplification factor) of K1.

Figure 3A:
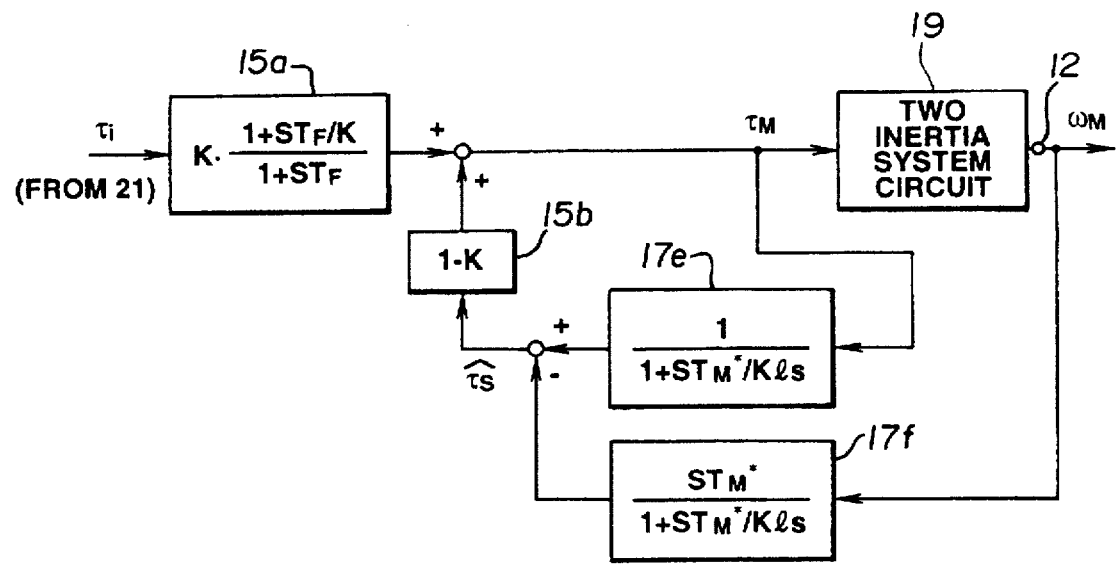
FIGS. 3A and 3B are circuit block diagrams of two modifications of the second preferred embodiment shown in FIG. 2, respectively.
Figure 3B:
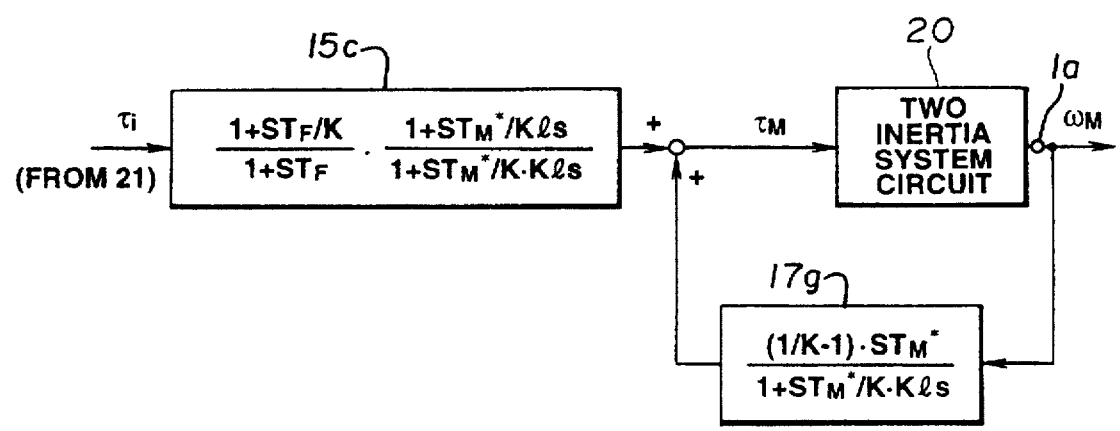

First modifications of the second embodiment in the circuit subsequent stages to the SFC section 21 in the second embodiment, i.e., the input torque value $\tau_i$ are shown in FIGS. 3A and 3B, respectively.

Figure 4:
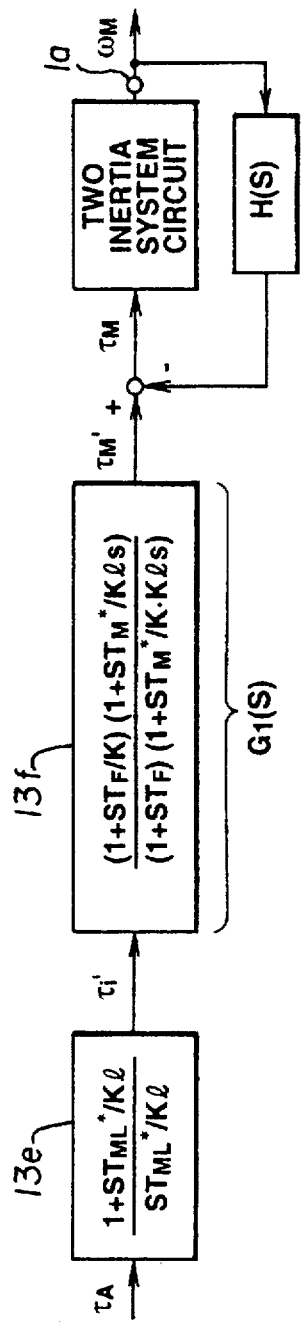
FIG. 4 is a circuit block diagram after a stage of a velocity amplifier in the second preferred embodiment shown in FIG. 2.

A second modification of the second embodiment in the circuit subsequent stages to the velocity amplifier 12 i.e., the output of the velocity amplifier $\tau_A$ is shown in FIG. 4.

In FIG. 4, a transfer function of H (S) is described in the following equation.

$$H(S) = b_2S^2 + b_1S + b_0 / (a_2S^2 + a_1S + a_0) \quad (22),$$

wherein $a_2 = (T_M^* \cdot T_F/K \cdot Kls)$, $a_1 = (T_F + T_M^*/K \cdot Kls)$, $a_0 = 1$, $b_2 = \{1/K(1+K1/Kls) - 1\}T_F \cdot T_M^*$.

$b_1 = \{(K1/Kls) + 1/K - 1)T_M^* + K1/K \cdot T_F\}$, and $b_0 = K1$.

If $T_F = 0$, the inertia lowering apparatus according to the present invention provides a combination between the resonance ratio control and SFC section and, at this time, H (S) (=$H_1(S)$) and $G_1(S)$ are as follows:

$$H_1(S) = \{(K1/Kls + 1/K - 1)T_M^*S + K1\}/(1 + ST_M^*/K \cdot Kls). \quad (23)$$

$$G_1(S) = \{1 + ST_M^*/Kls\}/\{1 + ST_M^*/K \cdot Kls\}. \quad (24)$$

In addition, if $T_F = T_M^*/Kls$, the low inertia control system according to the present invention provides the combination between the low inertia control system and SFC section.

At this time, H (S) (=$H_2(S)$) and $G_1(S)$ are as follows:

$$H_2(S) = \{(K1/K \cdot Kls + 1/K - 1)T_M^*S + K1\}/\{1 + ST_M^*/K \cdot Kls\}, \quad (25)$$

$$G_1(S) = 1. \quad (26)$$

As compared with the equations (22), (23), (24), (25) and (26), since $T_F \neq 0$, $T_F \neq T_M^*/Kls$, a numerator of the transfer function H(S) of the equation (22) gives a quadratic function. Consequently, since the number of degrees in the differential functions are increased (equation (22)), the effect or suppressing the axially torsional vibration can be improved in the case of the second embodiment.

(Third Embodiment)

Figure 5:
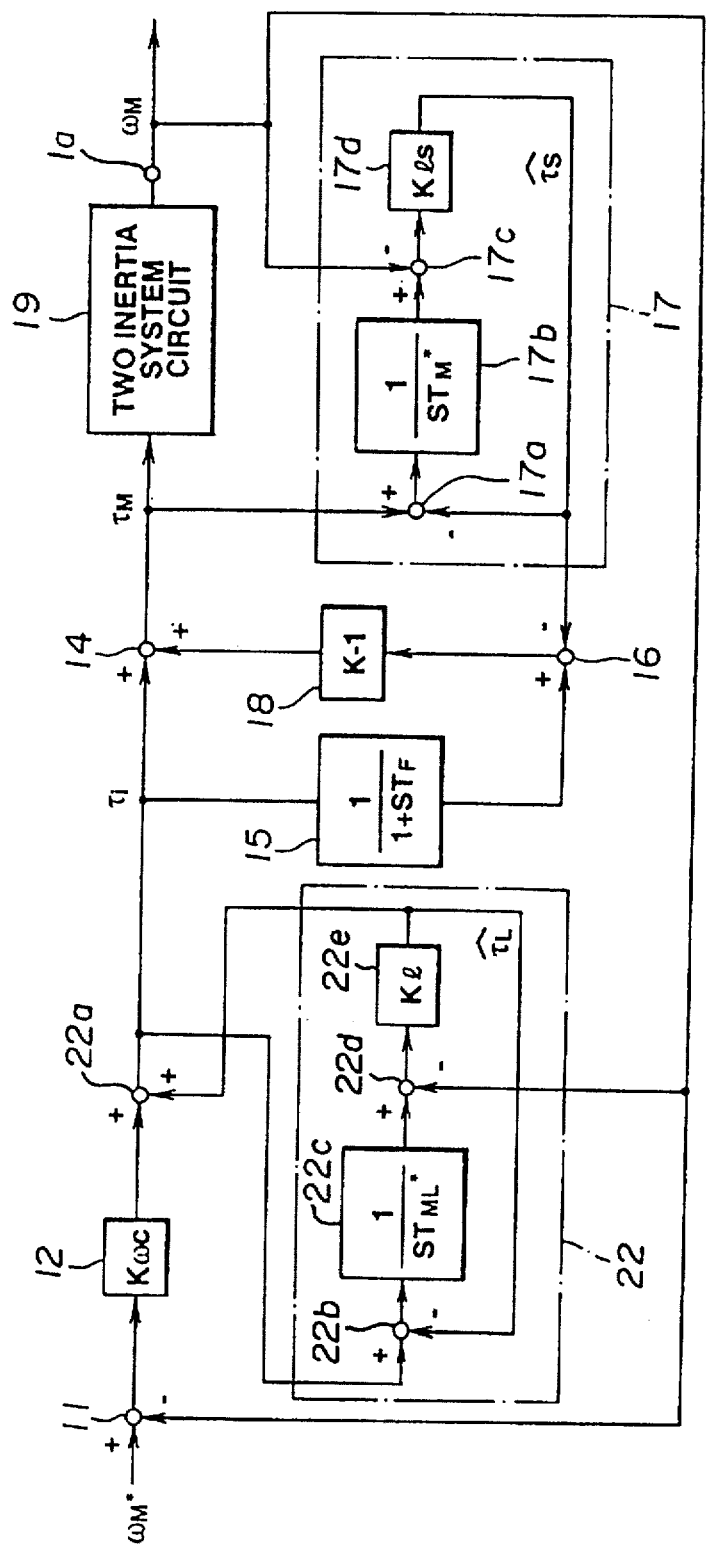
FIG. 5 is a circuit block diagram of a third preferred embodiment of the inertia lowering control apparatus according to the present invention.

FIG. 5 shows a third embodiment of the inertia lowering control system according to the present invention.

As shown in FIG. 5, the lead torque estimating observer 22 is installed, in addition to the circuit blocks in the case of the first embodiment described with reference to FIG. 1, in place of the SFC section 13.

(Fourth Embodiment)

Figure 6:
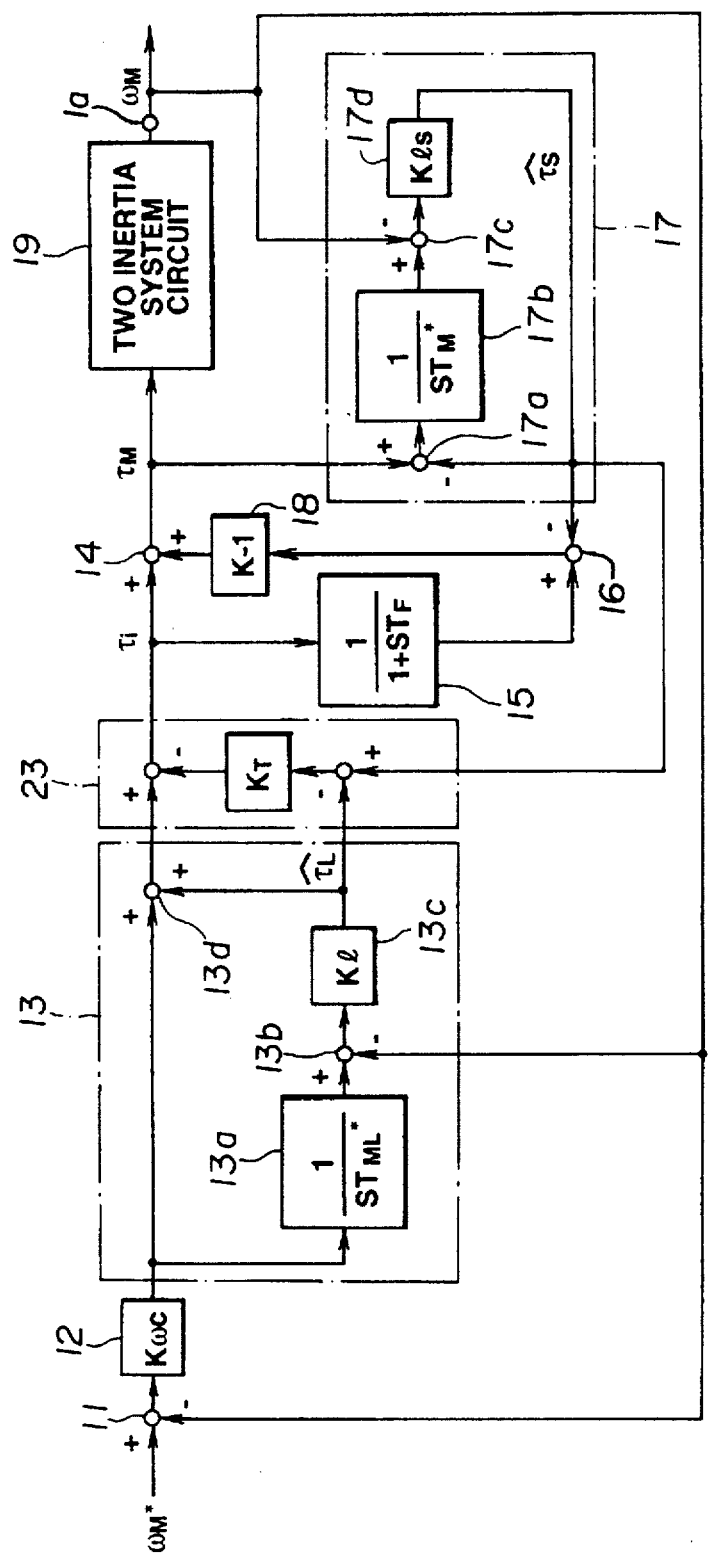
FIG. 6 is a circuit block diagram of a fourth preferred embodiment of the inertia lowering control apparatus according to the present invention.

FIG. 6 shows a fourth embodiment of the inertia lowering control system according to the present invention.

In FIG. 6, the reference numeral 13 indicates the SFC section having the generally the same structure as FIG. 1 outputting the load torque estimated value $\tau_L$ and the shaft torque estimated value $\tau_S$ is subtracted from the value $\tau_L$ by means of a deviator in a circuit block 23. Then, a feedback circuit 23 is, in the fourth embodiment, newly installed in addition to the circuits shown in FIG. 1. In FIG. 6, $K_T$ denotes the feedback gain of ($^\wedge\tau_S - ^\wedge\tau_L$).

(Fifth Embodiment)

Figure 7:
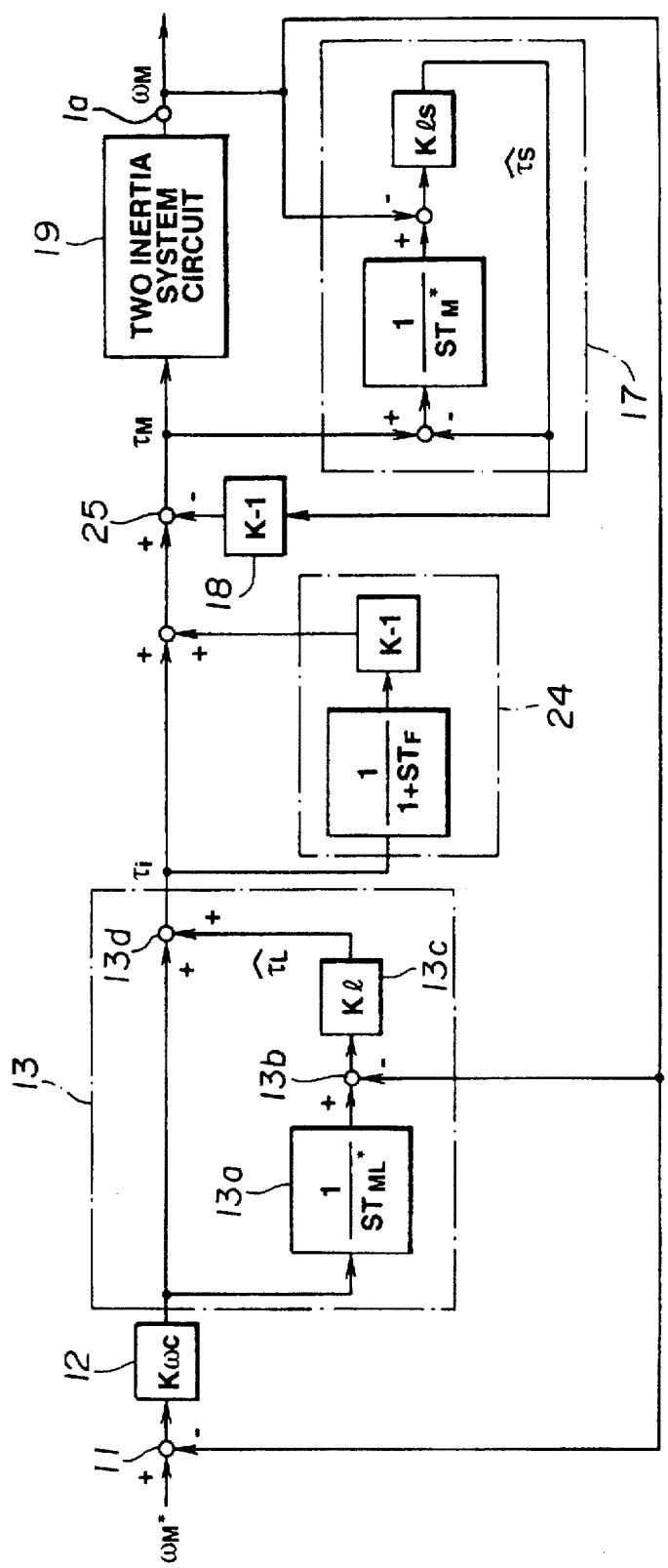
FIG. 7 is a circuit block diagram off a fifth preferred embodiment of the inertia lowering control apparatus according to the present invention.

FIG. 7 shows a fifth preferred embodiment of the inertia lowering control apparatus which is capable of suppressing the axially torsional vibration occurring on the flexible drive shaft in the two-mass inertia system 19 according to the present invention.

Although the structure shown in FIG. 7 is the same as that shown in FIG. 1, the connection of the first-order lag filter 24 and the gain portion in the reference numeral 24 is different from that 15 and gain (K−1) portion 18 shown in FIG. 1.

That is to say, the first-order lag filter 24 includes: the first-order lag filter having the same structure of the first-order lag filter 15 in the first embodiment and a gain portion having the low inertia lowering gain (K−1). In addition, a sixth deviator 25 is installed to deviate the output of the pre-stage of the adder (14) and the inertia lowering gain portion 18.

(Sixth Embodiment)

Figure 8:
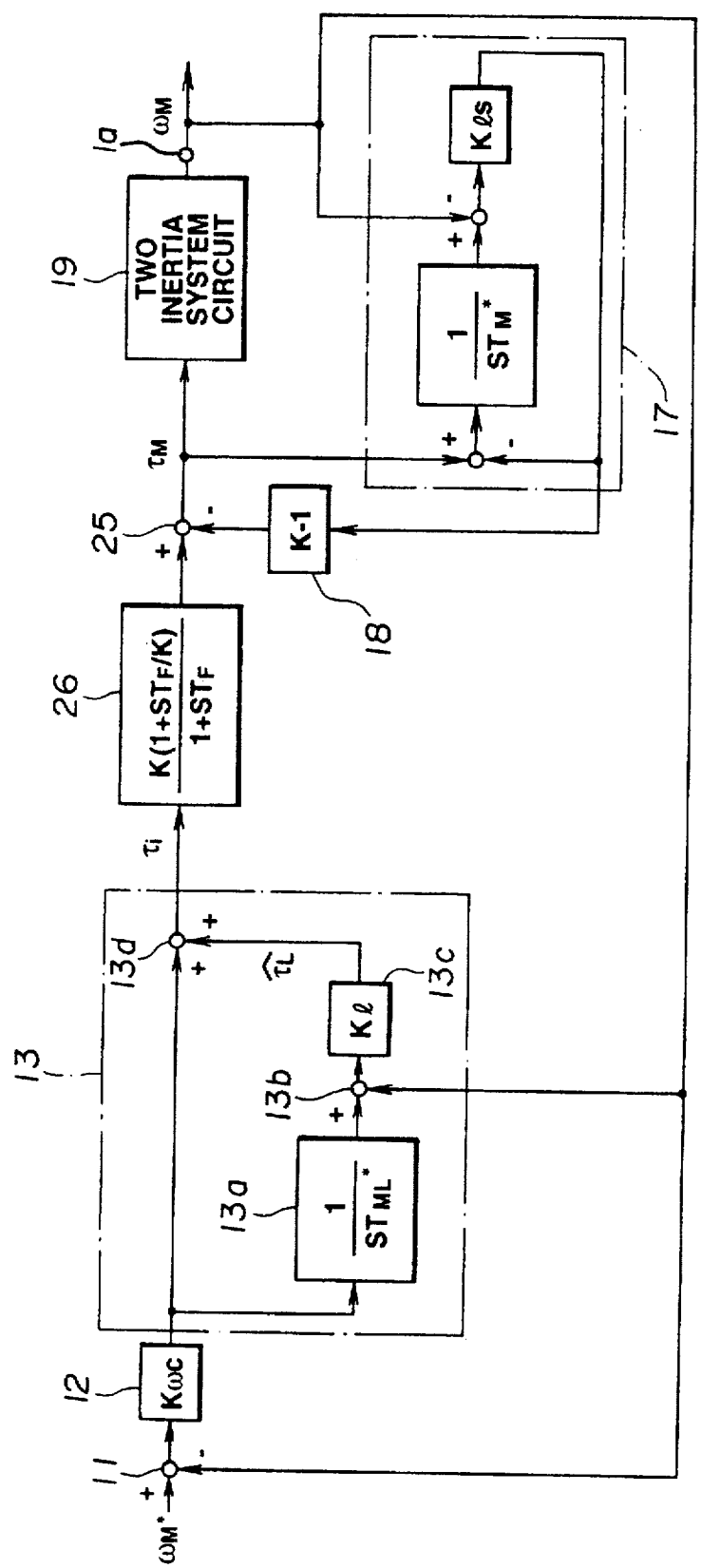
FIG. 8 is a circuit block diagram of a sixth preferred embodiment of the inertia lowering control apparatus according to the present invention.

FIG. 8 shows a sixth preferred embodiment of the inertia lowering control system for suppressing the torsional vibration occurring on the flexible drive shaft according to the present invention.

As shown in FIG. 8, the inertia lowering control apparatus in the sixth embodiment is generally the same as in the fifth embodiment except a circuit denoted by 26 which is newly installed in place of the adder and the first-order lag filter 24 shown in FIG. 7.

The newly added first-order lag and advance circuit 26 has a transfer function as $\{K+(1+S(T_F/K)\}/(1+ST_F)$.

As described below, each embodiment shown in FIGS. 1 through 8 has the same advantage as the suppression in the axially torsional vibration occurring on the flexible drive shaft in the two-mass inertia system 19.

Herein, results of simulations of the two-mass inertia system circuit 19 in the cases of the inertia lowering control system described before the first embodiment and described in the embodiments of the inertia lowering control system will be described with reference to FIGS. 9A through 14B.

Simulation conditions were $T_M=0.4$ S, $T_L=0.1$S, and $T_S=0.003$S.

Step (indicial) responses when $\omega_M*=0.02$ was input at 0 second and disturbance responses when the load torque $\tau_L$ was applied at 0.5 seconds were simulated.

Figure 9A:
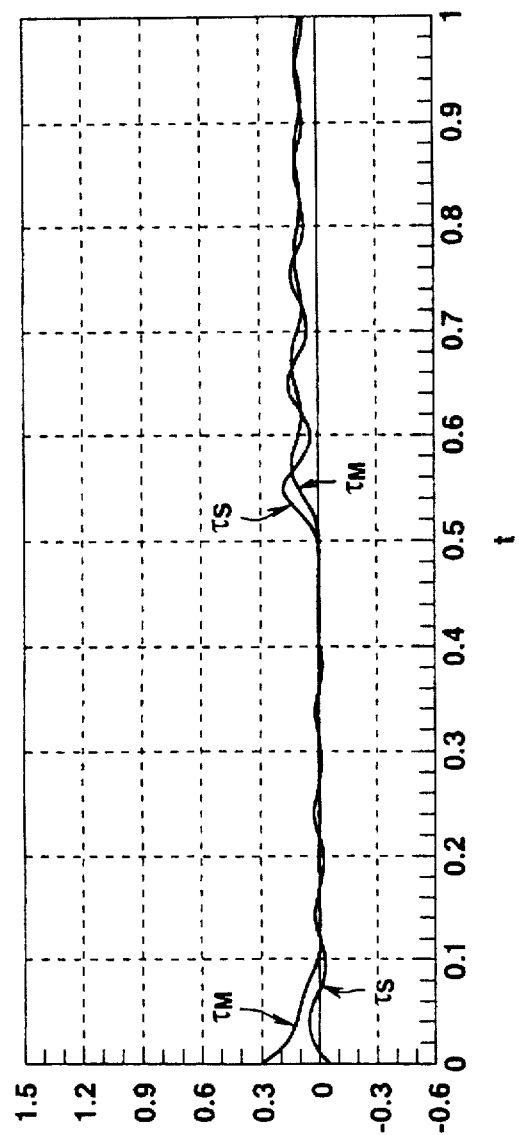
FIGS. 9A and 9B are characteristic graphs representing simulation results in a case where a conventional system described in the BACKGROUND OF THE INVENTION is actually operated.
Figure 9B:
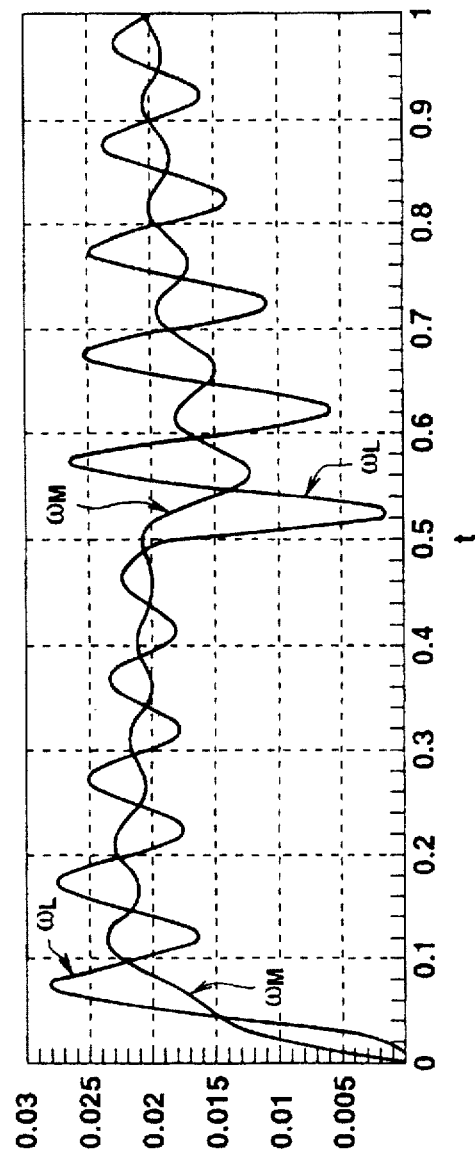

FIGS. 9A and 9B show the results of simulations when the inertia lowering control without the vibration suppression circuitry such as the first-order lag filter is not present but the inertia lowering control is carried out only by means of the velocity amplifier (PI element). The simulation conditions in the circuit were: amplifier gain $K\omega c=(T_M+T_L)\times\omega c=0.5S\times 30=15$ and time constant $T\omega c_{TI}=(1/\omega c)\times 5=0.167$S.

As appreciated from FIGS. 9A and 9B, no vibration suppression advantage in the circuit described above could be found.

FIGS. 10A and 10B show the simulation results of the previously proposed inertia lowering apparatus in which the axially torsional vibration suppression circuitry is only constituted by the SFC section, with the velocity amplifier having only the proportional gain.

The simulation conditions at this time were velocity amplifier gain $K\omega c=15$, SFC gain $Kl=3$, and SFC time constant $T_{ML}*=0.5$S. As appreciated from FIGS. 10A and 10B, no vibration suppression effect could be achieved.

FIGS. 11A through 14B are the simulation results in the case of the inertia lowering control apparatus including above-described embodiments.

Figure 11A:
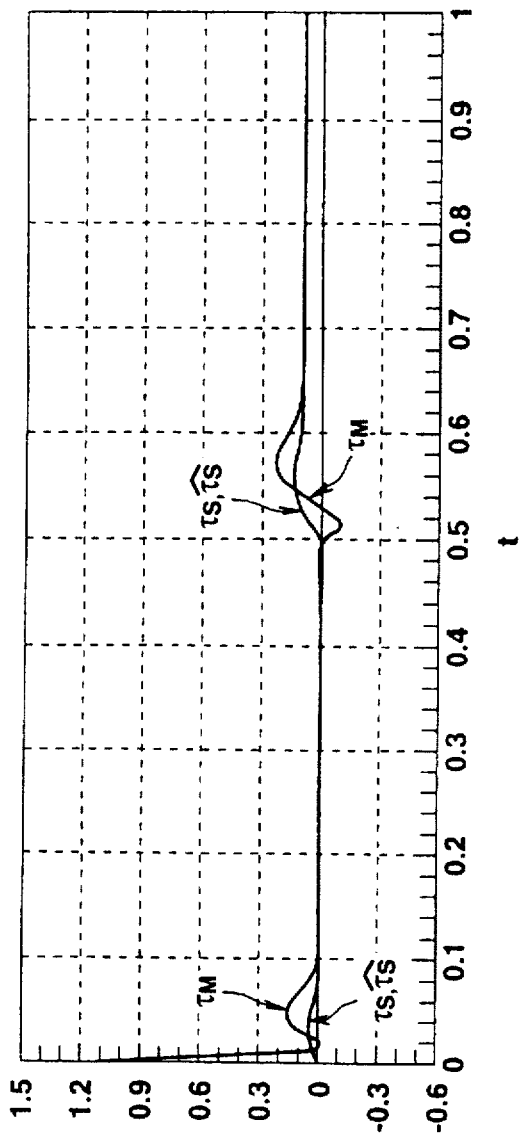
FIGS. 11A and 11B are are characteristic graphs representing simulation results in a case where the inertia lowering control apparatus in the first embodiment shown in FIG. 1 is actually operated with the gain of a first-order lag filter set to 1.
Figure 11B:
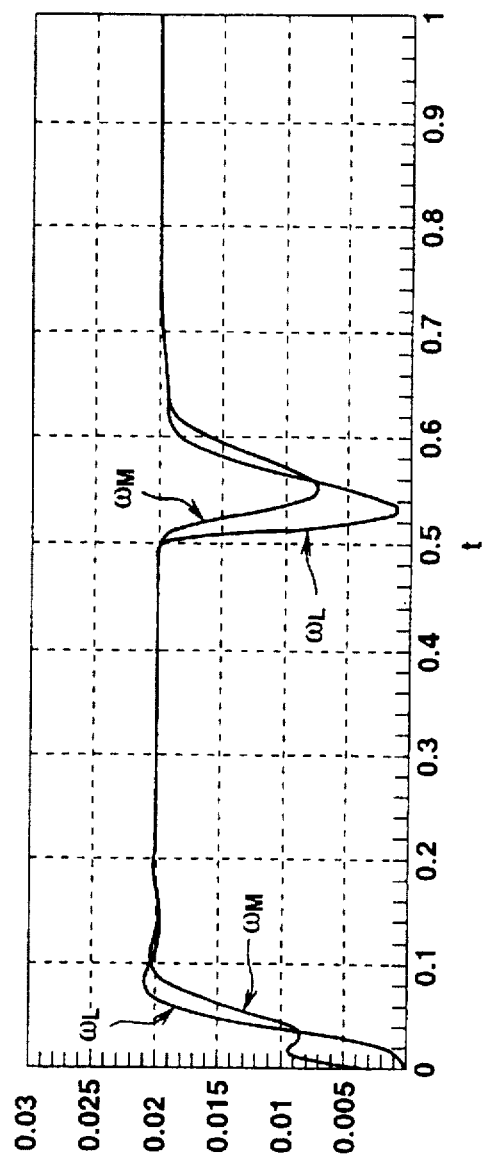

FIGS. 11A and 11B show the simulation results of the inertia lowering control apparatus in the case of the first embodiment shown in FIG. 1 but in which no first-order lag filter 15 is present, namely, the gain of the first-order lag filter is has the gain of 1. The simulation conditions were the speed response $\omega c=30$ rad/S, the velocity amplifier were only the proportional gain, $Kl=4$, and $T_{ML}*=0.125$S, and $Kls=200$, $T_M*=0.4$S, and $K=15$. In this case, the remarkably large axially torsional vibration suppression effect could be achieved.

Figure 12A:
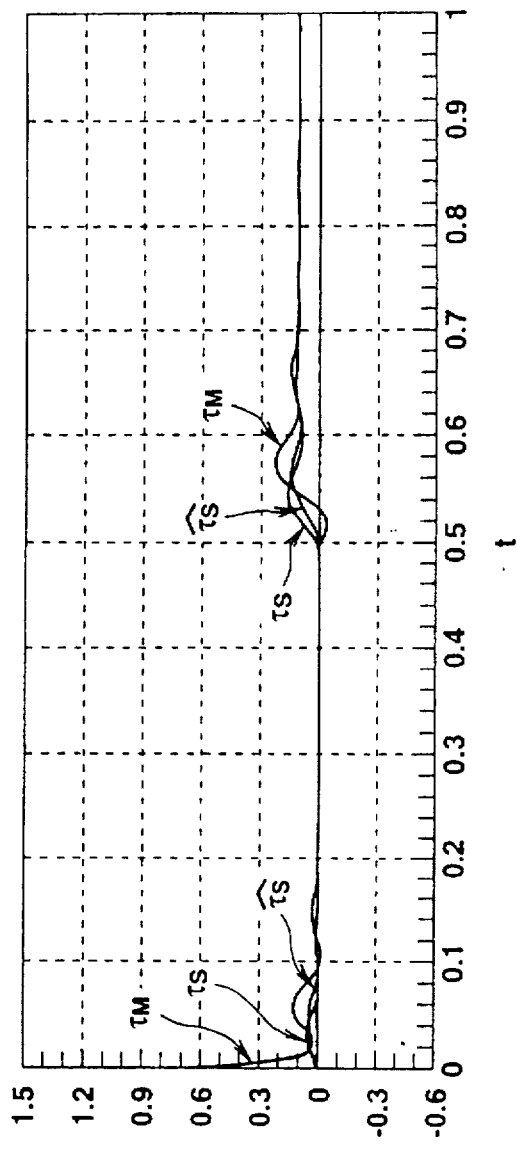
FIGS. 12A and 12B are characteristic graphs representing simulation results in a case where the inertia lowering control apparatus in the first embodiment shown in FIG. 1 is actually operated and a gain of the first-order lag filter is modified.
Figure 12B:
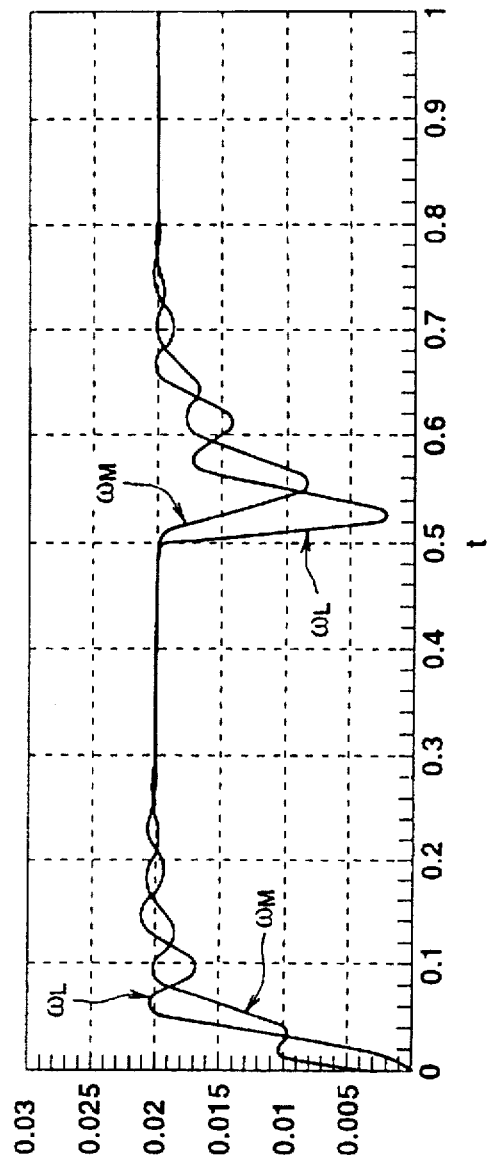

FIGS. 12A and 12B show results of simulations when under the above-described conditions in the cases of FIGS. 11A and 11B, a small value such as $KLs=25$ was set as the shaft torque estimating observer gain. Since, in this case, the gain of the shaft torque observer was set to the smaller value, the vibration suppression effect could be less and a more or less vibrations were left.

FIGS. 13A and 13B show the simulation results of the inertia lowering control apparatus in the case of the first embodiment shown in FIG. 1 in which the shaft torque estimating observer gain was set to $Kls=25$. Since the first-order lag filter was provided with the time constant of $T_F$, the effect of suppressing the axially torsional vibration was preferable. The simulation conditions in the case of FIGS. 13A and 13B were $T_F=8$ ms, $Kls=25$, and the other simulation conditions were the same as those in the case of FIGS. 11A and 11B.

Figure 14A:
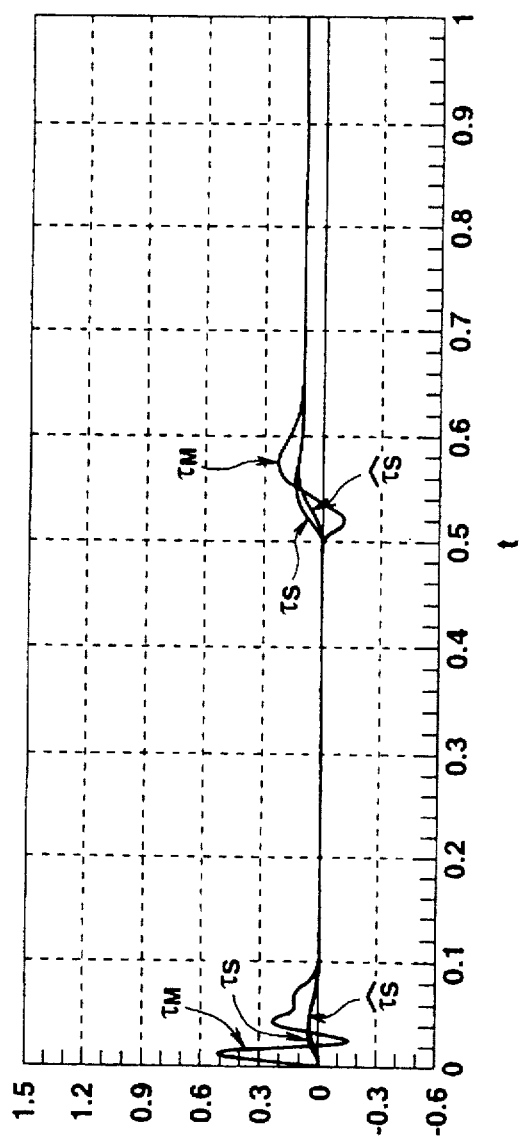
FIGS. 14A and 14B are characteristic graphs representing simulation results in a case where the inertia lowering control apparatus in the fourth embodiment shown in FIG. 6 is actually operated.
Figure 14B:
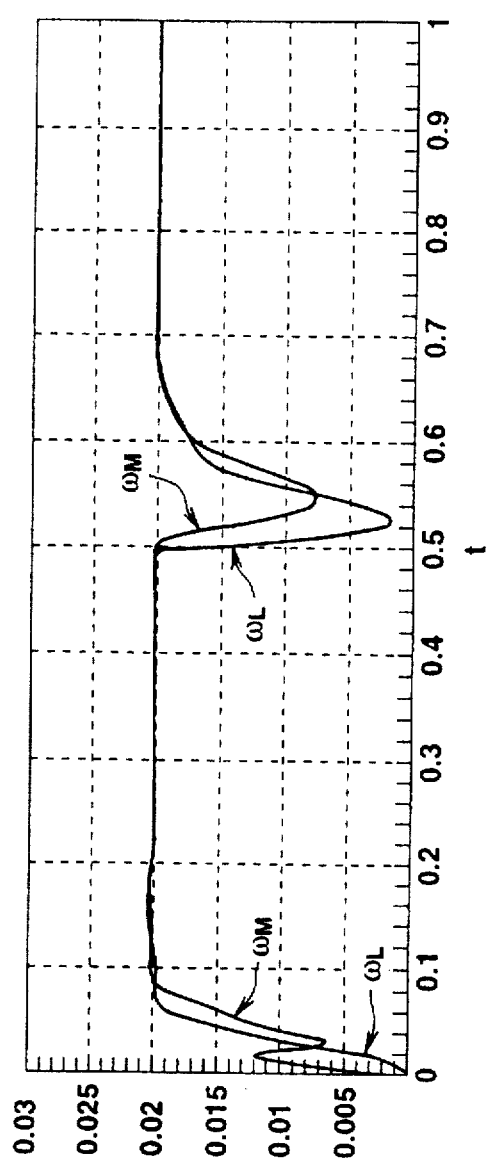
Figure 15:
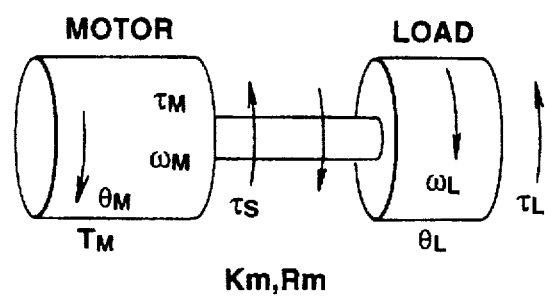
FIG. 15 is an explanatory view for explaining a two-mass inertia system model.

FIGS. 14A and 14B show the simulation results of the inertia lowering control apparatus in the case of the fourth embodiment shown in FIG. 6.

Since the feedback circuit portion which is so constructed and arranged as to provide the feedback gain for the subtraction result of the shaft torque estimated value $\char`\^\tau_S$ from the load torque estimated value $\char`\^\tau_L$. As appreciated from FIGS. 14A and 14B, the further vibration suppression effect could be achieved as compared with FIGS. 13A and 13B.

The simulation conditions at this time were: $K_T=0.5$, $T_F=8$ ms and $Kls=25$, and the other simulation conditions were the same as those in the case shown in FIGS. 11A and 11B.

According to the above-described simulation results, when the shaft torque estimating observer gain Kls was not relatively large, the vibration suppression effect was remarkable with the insertion of the first-order lag filter into the circuit as shown in the first embodiment of FIG. 1 and the further vibration suppression effect was achieved in the case of the circuit of FIG. 6 in which the feedback circuit 23 is inserted.

(Seventh Embodiment)

Figure 26:
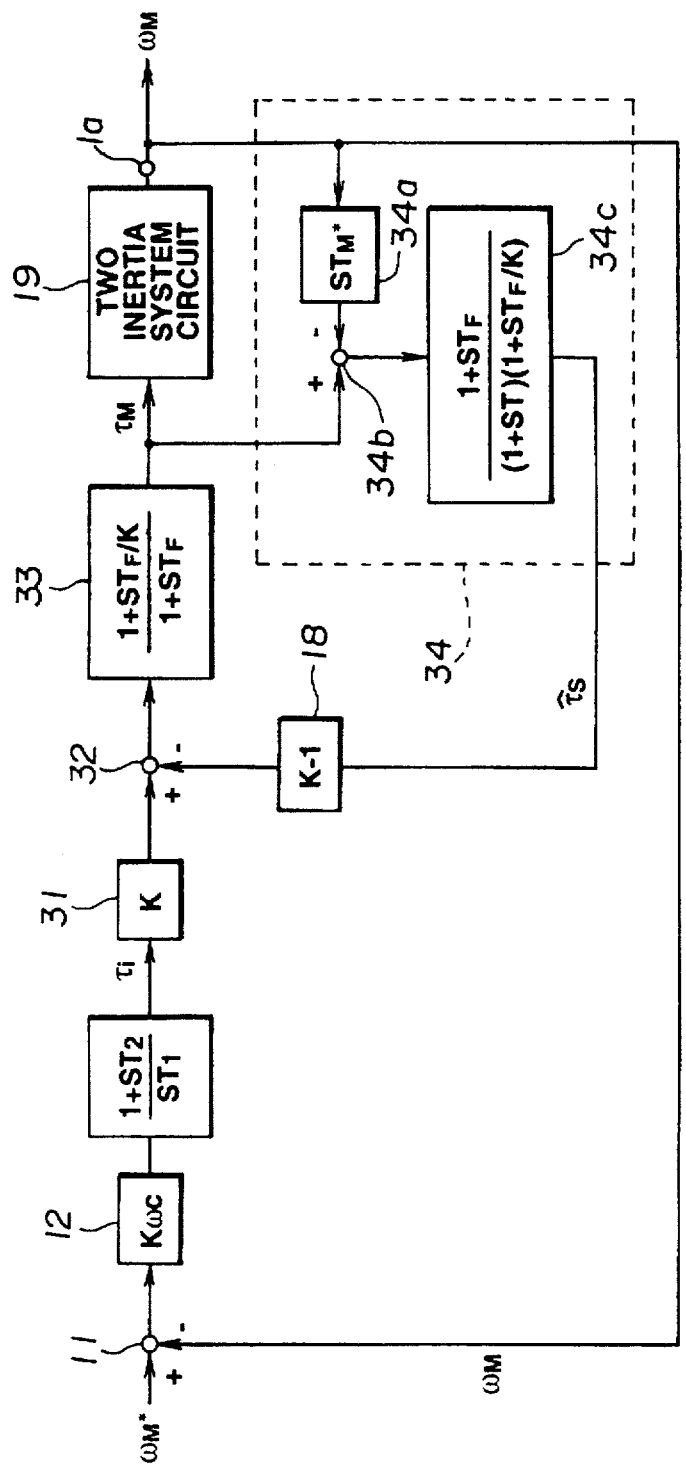
FIG. 26 is a circuit block diagram of a seventh preferred embodiment of the inertia lowering control apparatus according to the present invention.

FIG. 26 shows the circuit block diagram of the inertia lowering control apparatus according to the present invention in which the same reference numerals designate corresponding elements shown in FIGS. 1 through 8.

A gain portion 31 is provided at the subsequent circuit stage to the velocity amplifier 12 and receives the input torque value $\tau_i$ and an output of the gain portion 31 is supplied to a plus end of a deviator 32 and a minus end of the deviator 32 receives the output of the inertia lowering gain portion 18. A deviation output of the deviator is supplied to a compensation filter 33 having a transfer function as $\{1+S(T_F/K)\}/\{1+ST_F\}$.

The compensation filter 33 outputs the torque instruction value $\tau_M$ to the motor constituting the two-mass inertia system 19 and is so constructed and arranged as to pass the resonant frequency of the two-mass inertia system 19 in terms of the axially torsional vibration suppression.

In the seventh embodiment, the shaft torque estimating observer 34 includes: a) the first-order lag filter 34c providing the shaft torque estimated value $\char`\^\tau_S$; b) a differential element portion 34a which is so constructed and arranged as to differentiate $\omega_M$ with respect to $T_M*$ which corresponds to the motor mechanical time constant: and c) a deviator 34b which is so constructed and arranges as to deviate between the motor torque instruction value $\tau_M$ and an output of the differential element portion 34a.

It is noted that since, in the seventh embodiment, the first-order lag filter 34c provided in the shaft torque estimating observer 34 serves to eliminate the disturbance when the angular velocity of the motor $\omega_M$ is detected, the time constant in the shaft torque estimating observer 34 cannot generally be set smaller. However, if the time constant T is larger, the first-order lag filter 34c does not pass the resonance frequency in the two-mass inertia system 19 so that the suppression in the axially torsional vibration cannot be carried out. Therefore, in the seventh embodiment, the filter time constant $T_F$ of the first-order lag filter 34c is set as $T_F \approx T$ so that the influence of the observer time constant T can be canceled. In this way, if the compensation filter 33 and the first-order lag filter 34c are provided in the inertia lowering control apparatus, the axially torsional vibration can more remarkably be suppressed.

(Eighth Embodiment)

Figure 27:
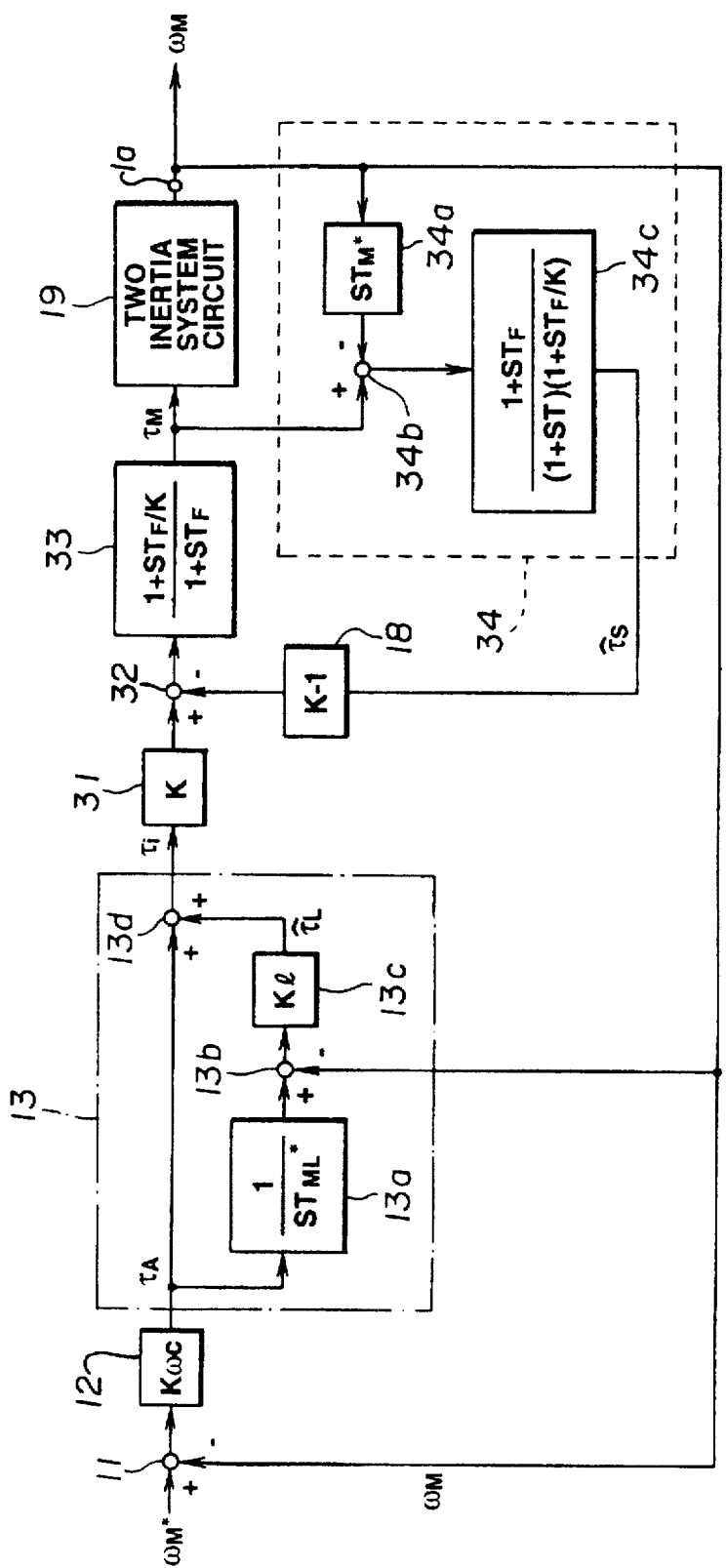
FIG. 27 is a circuit block diagram of an eighth preferred embodiment of the inertia lowering control apparatus according to the present invention.

FIG. 27 shows a circuit block diagram of an eighth preferred embodiment of the inertia lowering control apparatus according to the present invention.

As shown in FIG. 27, the SFC section 13 having the same structure as shown in FIG. 1 is interposed between the velocity amplifier 12 and the gain portion 31. The advantage in the eighth embodiment is the same as that in the first embodiment shown in FIG. 1.

(Ninth Embodiment)

Figure 28:
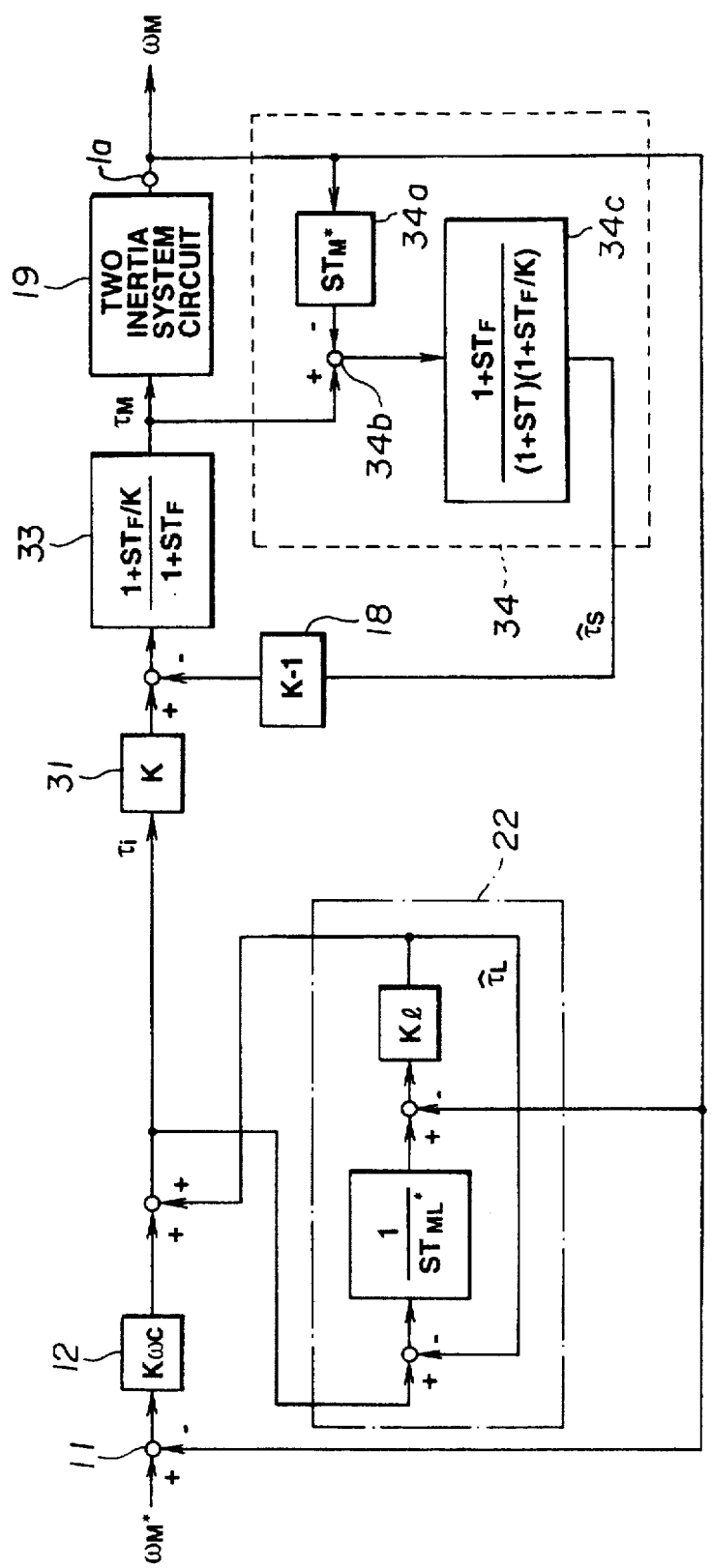
FIG. 28 is a circuit block diagram of a ninth preferred embodiment of the inertia lowering control apparatus according to the present invention.

FIG. 28 shows a circuit block diagram of a ninth preferred embodiment of the inertia lowering control apparatus according to the present invention.

As shown in FIG. 28, the load torque estimating observer 22 is disposed between the velocity amplifier 12 and the gain portion 31 described in the seventh embodiment shown in FIG. 26.

The advantage in the ninth embodiment is the same as that in the case of the third embodiment shown in FIG. 5.

(Tenth Embodiment)

Figure 29:
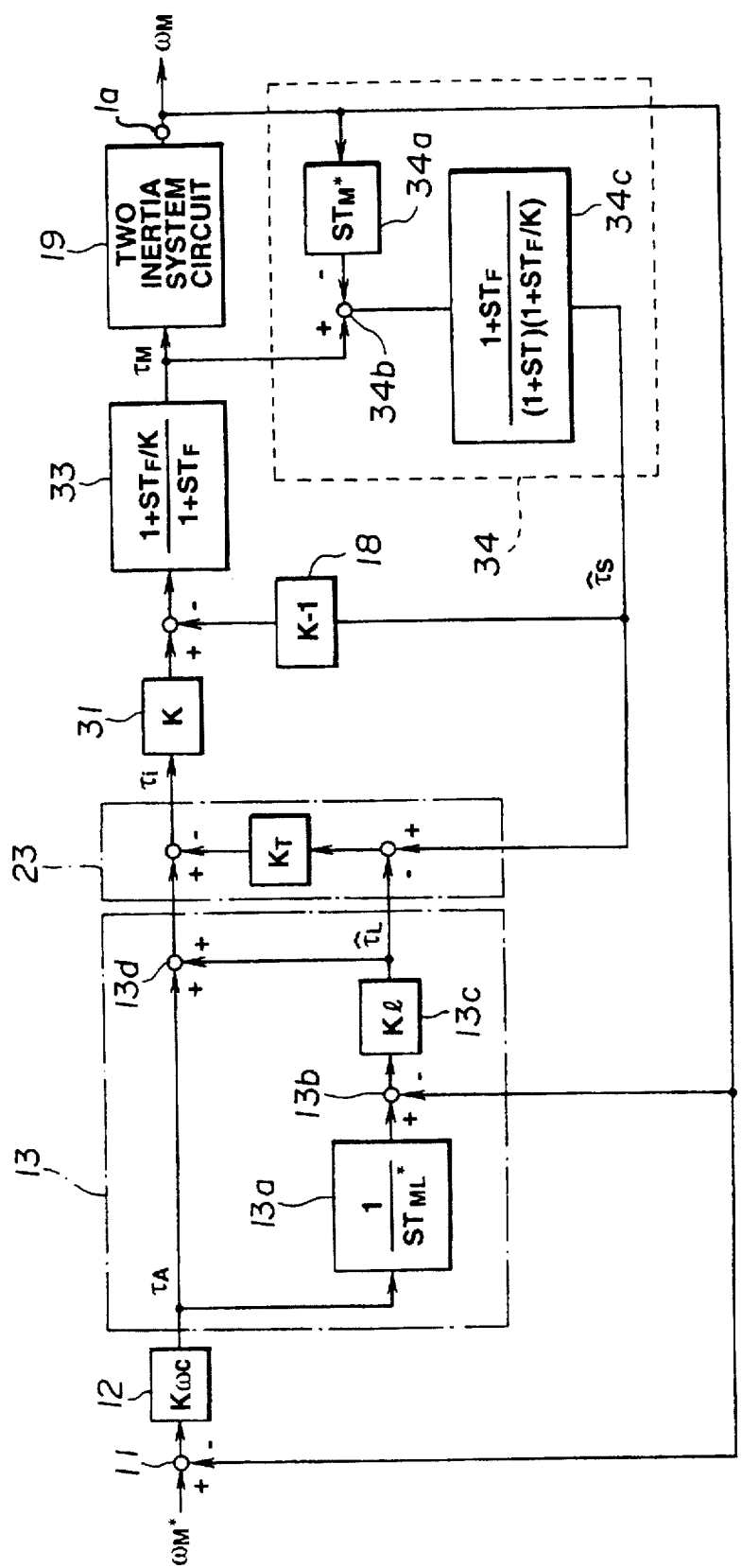
FIG. 29 is a circuit block diagram of a tenth preferred embodiment of the inertia lowering control apparatus according to the present invention.

FIG. 29 shows a circuit block diagram of the inertia lowering control apparatus in a tenth preferred embodiment according to the present invention.

As shown in FIG. 29, the feedback gain portion 23 having the structure as shown in FIG. 6 is installed between the circuit stage of the load torque estimating observer 13 and the gain portion 31 described in the ninth embodiment shown in FIG. 28. The advantage in the tenth embodiment is the same as that in the case of the fourth embodiment shown in FIG. 6.

It is noted that since the motor angular velocity $\omega_M$ is observable, means for detecting the actual angular velocity is provided in every embodiment.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An inertia lowering control apparatus used for suppressing an axially torsional vibration occurring on a flexible drive shaft in a two-mass inertia resonant system, said two-mass inertia resonant system having a motor, a load of the motor, and a flexible drive shaft interconnecting the load with the motor, the two-mass inertia resonant system having four transfer functions as:

$$G_{MM}(S) = \omega_M/\tau_M = 1/T_M S \cdot \{S^2 + 1/(T_S \cdot T_L)\}/\{S^2 + 1/T_S \cdot (1/T_M + 1/T_L)\},$$

$$G_{LM}(S) = \omega_M/\tau_L = -1/T_L S \cdot \{(1/T_M) \cdot (1/T_S)\}/\{S^2 + 1/T_S(1/T_M + 1/T_L)\},$$

$$G_{ML}(S) = \omega_L/\tau_M = 1/T_M S \cdot \{(1/T_S) \cdot (1/T_L)\}/\{S^2 + 1/T_S(1/T_M + 1/T_L)\}, \text{ and}$$

$$G_{LL}(S) = \omega_L/\tau_L = -1/T_L S \cdot \{S^2 + 1/(T_M \cdot 1/T_S)\}/\{S^2 + 1/T_S(1/T_M + 1/T_L)\},$$

wherein $S = \sigma + j\omega$ and denotes a Laplace transform operator, $\omega_M$ denotes a motor angular velocity, $\tau_M$ denotes a motor generation torque, $\tau_L$ denotes a load applied torque, $\omega_L$ denotes a load angular velocity, $T_M$ denotes a motor mechanical time constant, $T_S$ denotes a shaft spring time constant, $T_M$ denotes a motor mechanical time constant, $T_L$ denotes a load mechanical time constant, $G_{MM}(S)$ denotes a first transfer function to transfer $\tau_M$ to $\omega_M$ in a model of said two-inertia resonant system, $G_{LM}(S)$ denotes a second transfer function to transfer $\tau_L$ to $\omega_M$ in the model thereof, $G_{ML}(S)$ denotes a third transfer function to transfer $\tau_M$ to $\omega_L$ in the model thereof, and $G_{LL}(S)$ denotes a fourth transfer function to transfer $\tau_L$ to $\omega_L$ in the model thereof, said inertia lowering control apparatus comprising:

a) a motor angular velocity detector arranged for detecting the motor angular velocity ($\omega_M$) of the motor in said two-inertia resonant system and outputting the detected motor angular velocity;

b) a velocity amplifier for amplifying, by at least a proportional control gain (K$\omega$c), a difference between a motor angular velocity instruction value ($\omega_M^*$) and the detected motor angular velocity, and for outputting the amplified difference ($\tau_A$);

c) a disturbance suppressing circuit for receiving the amplified difference ($\tau_A$) from said velocity amplifier and the detected motor angular velocity ($\omega_M$), and for providing an input torque ($\tau_i$) for the motor constituting the two-mass inertia resonant system so that a disturbance is prevented from being input to the motor;

d) an axially torsional vibration suppressing circuit, for receiving the motor input torque ($\tau_i$) from said disturbance suppressing circuit, and for filtering the input torque ($\tau_i$) of said disturbance suppressing circuit so as to suppress the axially torsional vibration in the two-mass inertia resonant system and so as to provide the motor generation torque ($\tau_M$) supplied to the motor of the two-mass resonant system; and e) a shaft applied torque estimating observer for receiving the detected motor angular velocity ($\omega_M$) and the motor generation torque ($\tau_M$) supplied to the motor of the two-inertia resonant system and for estimating a shaft applied torque value ($\hat{\tau}_S$), said estimated shaft applied torque value being supplied to said vibration suppressing circuit, wherein said vibration suppressing circuit also receives the estimated shaft applied torque value ($\hat{\tau}_s$) to filter the estimated shaft applied torque value together with the motor input torque ($\tau_i$) to suppress the axially torsional vibration in the two-mass inertia resonant system and so as to provide the motor generation torque ($\tau_M$) supplied to the motor of the two-mass resonant system.

2. An inertia lowering control apparatus used for suppressing an axially torsional vibration in a two-mass inertia resonant system as claimed in claim 1, wherein said disturbance suppressing circuit comprises a simulator following control circuitry (SFC section) having: a) an integrator for integrating the amplified difference ($\tau_A$) of said velocity amplifier with an inertia moment (T$_{ML}^*$) as $\tau_A \cdot 1/ST_{ML}^*$;

b) a difference determiner for determining a difference between an output of said integrator and the motor angular velocity ($\omega_M$);

c) a gain portion for having a constant SFC gain K1; and d) an adder for adding the amplified difference ($\tau_A$) of the velocity amplifier and the difference as determined by the difference determiner, and for providing the motor input torque $\tau_i$ thereat.

3. An inertia lowering control apparatus used for suppressing an axially torsional vibration in a two-mass inertia resonant system as claimed in claim 2, wherein said vibration suppressing circuit comprises:

e) a first-order lag filter for having a transfer function of $1/(1+ST_F)$, wherein T$_F$ denotes a time constant of the first-order lag filter, said first-order lag filter receiving the motor input torque $\tau_i$ from said disturbance suppressing circuit;

f) a low inertia gain portion for receiving the output of said first-order lag filter having a low inertia gain expressed as (K−1), wherein K denotes a predetermined inertia lowering feedback gain;

g) a second difference determiner for determining a difference between the shaft applied torque estimated value ($\char`\^\tau_S$) and the shaft torque estimating observer, and for outputting the difference to said low inertia gain portion; and h) a second adder for adding the output of said low inertia gain portion to the motor input torque $\tau_i$ from said disturbance suppressing circuit and outputting the added result as the motor generation torque $\tau_M$ to said two-mass inertia resonant system and to said shaft applied torque estimating observer.

4. An inertia lowering control apparatus used for suppressing an axially torsional vibration in a two-mass inertia resonant system as claimed in claim 3, wherein said shaft applied torque estimating observer comprises:

i) a third difference determiner for determining a difference between the motor generation torque $\tau_M$ and said second adder and the shaft applied torque estimated value $\char`\^\tau_S$;

j) an observer inertia moment torque integrator for receiving the difference from said third difference determiner and for integrating the received difference with $1/T_M^*$ to provide a motor angular velocity estimated value $\char`\^\omega'_M$;

k) a fourth difference determiner for determining a difference between the motor angular velocity estimated value $\char`\^\omega'_M$ and the motor angular velocity $\omega_M$; and l) an observer gain portion having a shaft applied torque observer gain (Kls) and for providing the shaft applied torque estimated value $\char`\^\tau_S$ from the difference of said fourth difference determiner.

5. An inertia lowering control apparatus used for suppressing an axially torsional vibration in a two-mass inertia resonant system as claimed in claim 4, wherein $T_{ML}^*=T_M^*+T_L$, $T_M^*=T_M$, $T_M$ denotes a unit inertia constant of the motor, $T_L$ denotes a load unit inertia constant, and $K=T_M/T_L$ ($R^2-1$), R denotes a ratio of resonant frequencies between the motor and load.

6. An inertia lowering control apparatus used for suppressing an axially torsional vibration in a two-mass inertia resonant system as claimed in claim 5, wherein $R^2=5$.

7. An inertia lowering control apparatus used for suppressing an axially torsional vibration in a two-mass inertia resonant system as claimed in claim 1, wherein said disturbance suppressing circuit comprises:

a) a first circuit having a transfer function of $\{1+S(T_{ML}^*/Kl)\}/\{Kl\ (ST_{ML}^*/Kl)\}$;

b) a first difference determiner for determining a difference between an output of the first circuit and the observed motor angular velocity $\omega_M$; and c) a gain portion having a gain of Kl, said gain portion receiving the difference from the first difference determiner and outputting the motor input torque $\tau_i$.

8. An inertia lowering control apparatus used for suppressing an axially torsional vibration in a two-mass inertia resonant system as claimed in claim 7, wherein said vibration suppressing circuit further comprises:

d) a second circuit having a transfer function as $K \cdot \{(1+S(T_F/K)\}/\{1+ST_F\}$; and e) a velocity feedback gain portion for multiplying the load torque estimated value $\char`\^\tau_S$ of the shaft applied torque observer by (1−K).

9. An inertia lowering control apparatus used for suppressing an axially torsional vibration in a two-mass inertia resonant system as claimed in claim 8, wherein said shaft applied torque observer comprises:

a third circuit having a transfer function as $1/\{1+ST_M^*/Kls\}$; and a fourth circuit having a transfer function as $ST_M^*/\{1+ST_M^*/Kls\}$.

10. An inertia lowering control apparatus used for suppressing an axially torsional vibration in a two-mass inertia resonant system as claimed in claim 9, wherein $\char`\^\tau_S = 1/\{1+ST_M^*/Kls\}\tau_M - \{ST_M^*/Kls\}\omega_M$.

11. An inertia lowering control apparatus used for suppressing an axially torsional vibration in a two-mass inertia resonant system as claimed in claim 8, wherein said vibration suppressing circuit comprises a circuit having a transfer function of:

$\{1+ST_F/F\}/\{1+ST_F\}\cdot\{1+ST_M^*/Kls\}/\{1+ST_M^*/(K\cdot Kls)\}$.

12. An inertia lowering control apparatus used for suppressing an axially torsional vibration in a two-mass inertia resonant system as claimed in claim 9, wherein said shaft torque estimating observer comprises a circuit having a transfer function of:

$\{1/(K-1)\}\cdot ST_M^*/\{1+ST_M^*/(K\cdot Kls)\}$.

13. An inertia lowering control apparatus for suppressing an axially torsional vibration in a two-mass inertia resonant system as claimed in claim 12, wherein $\tau_M=\{1+ST_F/K\}/\{1+ST_F\}\cdot\{1+ST_M^*/Kls\}/\{1+ST_M^*/(K\cdot Kls)\}\tau_i+\{1/(K-1)\}\cdot ST_M^*/\{1+ST_M^*/(K\cdot Kls)\}\omega_M$.

14. An inertia lowering control apparatus used for suppressing an axially torsional vibration in a two-mass inertia resonant system as claimed in claim 8, wherein said vibration suppressing circuit comprises:

a first circuit having a transfer function of:

$\{(1+ST_{ML}^*/Kl)/(ST_{ML}^*/Kl)\}$; and a second circuit having a transfer function of:

$G_1(S)$ of $G_1(S)=\{1+ST_F/K\}/\{1+ST_F\}\cdot\{1+ST_M^*/Kls\}/\{1+ST_M^*/(K\cdot Kls)\}$.

15. An inertia lowering control apparatus used for suppressing an axially torsional vibration in a two-mass inertia resonant system as claimed in claim 14, wherein said shaft applied torque estimating observer comprises a third circuit having a transfer function H(S) of:

$H(S)=\{b_2S^2+b_1S+b_0\}/\{a_2S^2+a_1S+a_0\}$, wherein $a_2=(T_M^*\cdot T_F/K\cdot Kls)$, $a_1=(T_F+T_M^*/K\cdot Kls)$, $a_0=1$, $b_2=\{1/K\cdot(1+Kl/Kls)-1\}\cdot T_F\cdot T_M^*$, $b_1=\{(Kl/Kls)+1/K-1\}\ T_M^*+Kl/K\cdot T_F\}$, and $b_0=Ke$, wherein $T_F\neq 0$ and $T_F\neq T_M^*/Kls$.

16. An inertia lowering control apparatus used for suppressing an axially torsional vibration in a two-mass inertia resonant system as claimed in claim 15, wherein when $T_F=0$, $H(S)=H_1(S)=\{Kl/Kls+1/K\ -1\}T_M^*S+Kl\}/\{1+ST_M^*/K\cdot Kls\}$, and $G_1(S)=\{1+ST_M^*/Kls\}/\{1+ST_M^*/K\cdot Kls\}$.

17. An inertia lowering control apparatus for suppressing an axially torsional vibration in a two-mass inertia resonant system as claimed in claim 15, wherein when $T_F=T_M^*/Kls$, $H(S)=H_2(S)=\{Kl/K\cdot Kls+1/K\ -1\}T_M^*S+Kl\}/\{1+ST_M^*/K\cdot Kls\}$, $G_1(S)=1$.

18. An inertia lowering control apparatus used for suppressing an axially torsional vibration in a two-mass inertia resonant system as claimed in claim 1, wherein said disturbance suppressing circuit comprises a load torque estimating observer having:
  a) a first adder;
  b) a first subtractor;
  c) an integrator having a transfer function of $1/ST_{ML}^*$ and receiving an output of said first subtractor;
  d) a second subtractor which is so constructed and arranged as to subtract the detected motor angular velocity $\omega_M$ from an output of said integrator; and
  e) an amplifier having a proportional gain of K1, an output of the amplifier being an estimated value of the load torque $\char`\^\tau_L$ and being supplied to said first adder and to said first subtractor, said first adder adding the output of the velocity amplifier to the output estimated value of the amplifier so as to provide the input torque $\tau_i$, and said first subtractor subtracting the output of the first adder from the estimated load torque value $\char`\^\tau_L$.

19. An inertia lowering control apparatus used for suppressing an axially torsional vibration in a two-mass inertia resonant system as claimed in claim 5, which further includes a feedback circuit having a first subtractor for subtracting the output of the simulator following circuitry section from a subtraction result between the shaft applied torque estimated value $\char`\^\tau_S$ from said shaft torque applied torque estimating observer and the load torque estimated value $\char`\^\tau_L$ from the simulator following control circuitry section with a feedback gain of $K_T$.

20. An inertia lowering control apparatus used for suppressing an axially torsional vibration in a two-mass inertia resonant system as claimed in claim 2, wherein said vibration suppressing circuit further comprises:
  e) a first-order lag filter with a transfer function of $1/\{1+ST_F\}$, said first-order lag filter receiving the output input torque $\tau_i$ from said disturbance suppressing circuit;
  f) an inertia lowering gain portion having a gain of (K−1) to receive an output of said first-order lag filter;
  g) a second adder to add the input torque $\tau_i$ from said simulator following circuitry and an output of said inertia lowering gain portion, said inertia lowering gain amplifier having a gain of (K−1); and
  h) a third difference determiner for determining a difference between the output of the second adder and an output of another inertia lowering gain portion having an input receiving the estimated value of the shaft applied torque $\char`\^\tau_S$ of said shaft applied torque estimating observer.

21. An inertia lowering control apparatus used for suppressing an axially torsional vibration in a two-mass inertia resonant system as claimed in claim 2, wherein said vibration suppression circuit comprises:
  a) a first-order lag and advance filter having a transfer function of:

$$K(1+ST_F/K)/\{1+ST_F\};$$

b) an inertia lowering gain portion having a gain of (K−1) and receiving the estimated value of the shaft applied torque $\tau_S$ from said shaft applied torque estimating observe; and
  c) a first subtractor to subtract an output of the inertia lowering gain portion from the first-order lag and advance filter.

22. An inertia lowering control apparatus used for suppressing an axially shaft torsional vibration in a two-mass inertia resonant system, said system having a motor, a load, and a flexible drive shaft interconnecting the load with the motor, the two-mass inertia resonant system having four transfer functions as:

$$G_{MM}(S)=\omega_M/\tau_M=1/T_M S\cdot\{S^2+1/(T_S\cdot T_L)\}/\{S^2+1/T_S(1/T_M+T_L)\},$$

$$G_{LM}(S)=\omega_M/\tau_L=1/T_L S\cdot\{(1/T_M)\cdot(1/T_S)\}/\{S^2+1/T_S(1/T_M+T_L)\},$$

$$G_{ML}(S)=\omega_L/\tau_M=1/T_M S\cdot\{(1/T_S)\cdot(1/T_L)\}/\{S^2+1/T_S(1/T_M+1/T_L)\}; \text{ and}$$

$$G_{LL}(S)=\omega_L/\tau_L=1/T_L S\cdot\{S^2+1/T_M\cdot 1/T_S\}/\{S^2+1/T_S(1/T_M+1/T_L)\};$$

wherein $S=\sigma+j\omega$ and denotes a Laplace transform operator, $\omega_M$ denotes a motor angular velocity, $\tau_M$ denotes a motor generation torque, $\tau_L$ denotes a load applied torque, $\omega_L$ denotes a load angular velocity, $T_M$ denotes a motor mechanical time constant, $T_S$ denotes a shaft spring time constant, $T_M$ denotes a motor mechanical time constant, and $T_L$ denotes a load mechanical time constant, $G_{MM}(S)$ denotes a first transfer function to transfer $\tau_M$ to $\omega_M$ in a model of said two-inertia resonant system $G_{LM}(S)$ denotes a second transfer function to transfer $\tau_L$ to $\omega_M$ in the model thereof, $G_{ML}(S)$ denotes a third transfer function to transfer $\tau_M$ to $\omega_L$ in the model thereof and $G_{LL}(S)$ denotes a fourth transfer function to transfer $\tau_L$ to $\omega_L$ in the model thereof, said inertia lowering control apparatus comprising:
  a) an angular velocity detector for detecting an angular velocity ($\omega_M$) of the motor;
  b) a Proportional-Integral velocity (PI) amplifier to amplify a difference between a motor angular velocity instruction value ($\omega_M^*$) of the motor in said two-inertia resonant system and the detected angular velocity ($\omega_M$) of the motor;
  c) a flexible drive shaft applied torque estimating observer having a first-order lag filter to derive an estimated value ($\char`\^\tau_S$) of the shaft applied torque via said first-order lag filter, said first-order lag filter having a transfer function as $(1+ST_F)/\{(1+ST)(1+ST_F/K)\}$, wherein T denotes an observer time constant and approximately equal to $T_F$;
  d) a gain circuit to amplify the shaft applied torque estimated value derived through the first-order lag filter with a gain of (K−1), wherein K denotes a inertia ratio between the motor and load;
  e) a difference determination circuit for determining a difference between an output of the gain circuit and the input torque ($\tau_i$) which is derived from the PI amplifier and multiplied by the gain of K; and
  f) a compensation filter to receive an output of the deviator and provide a torque instruction value ($\tau_M$) to the motor of the two-mass inertia resonant system, said compensation filter having a transfer function of $(1+ST_F/K)/(1+ST_F)$, wherein S denotes a Laplace transform operator.

23. An inertia lowering control apparatus used for suppressing an axially torsional vibration in a two-mass inertia resonant system as claimed in claim 22, which further comprises a simulator following control circuitry having:
  a) an integrator to integrate the output $\tau_A$ of said velocity amplifying means with an inertia moment $T_{ML}^*$ as $\tau_A \cdot 1/ST_{ML}^*$;
  b) a second difference determination circuit for determining a difference between an output of said integrator and the motor angular velocity ($\omega_M$);
  c) a gain portion with a constant SFC gain K1; and d) a first adder to add the output $\tau_A$ of the velocity amplifying means and the deviation output of said second difference determination circuit.

24. An inertia lowering control apparatus used for suppressing an axially torsional vibration in a two-mass inertia resonant system as claimed in claim 22, which further comprises a load torque estimating observer to estimate a load torque $\char`\^\tau_L$ on the basis of an output ($\tau_i$) of the PI amplifier and the detected motor angular velocity ($\omega_M$).

25. An inertia lowering control apparatus used for suppressing an axially torsional vibration in a two-mass inertia resonant system as claimed in claim 23, which further includes a feedback circuit having a first subtractor to subtract the output of the simulator following circuitry from a subtraction result between the shaft applied torque estimated value $\char`\^\tau_S$ from said shaft torque applied torque estimating observer and the load torque estimated value $\char`\^\tau_L$ from the simulator following control circuit with a feedback gain of $K_T$.

26. An inertia lowering control apparatus used for suppressing an axially torsional vibration in a two-mass inertia resonant system as claimed in claim 24, which further includes a feedback circuit having a first subtractor to subtract the output of the load torque estimating observer from a subtraction result between the shaft applied torque estimated value $\char`\^\tau_S$ from said shaft torque applied torque estimating observer and the load torque estimated value $\char`\^\tau_L$ from the simulator following control circuit with a feedback gain of $K_T$.

* * * * *